United States Patent
Stammers et al.

(10) Patent No.: US 11,395,354 B2
(45) Date of Patent: *Jul. 19, 2022

(54) METHODS AND APPARATUS FOR SELECTING NETWORK SLICE, SESSION MANAGEMENT AND USER PLANE FUNCTIONS

(71) Applicant: Cisco Technology, Inc., San Jose, CA (US)

(72) Inventors: Timothy Peter Stammers, Raleigh, NC (US); Aeneas Sean Dodd-Noble, Andover, MA (US); Humberto Jose La Roche, Ocean, NJ (US); Arun C. Alex, Nashua, NH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/884,820

(22) Filed: May 27, 2020

(65) Prior Publication Data

US 2020/0288513 A1    Sep. 10, 2020

Related U.S. Application Data

(63) Continuation of application No. 15/894,498, filed on Feb. 12, 2018, now Pat. No. 10,764,935.

(51) Int. Cl.
*H04W 72/04*    (2009.01)
*H04W 76/10*    (2018.01)
(Continued)

(52) U.S. Cl.
CPC ............. *H04W 76/10* (2018.02); *H04W 8/02* (2013.01); *H04W 48/18* (2013.01); *H04W 72/04* (2013.01)

(58) Field of Classification Search
CPC ..... H04W 76/00; H04W 88/08; H04W 48/18; H04W 72/04; H04W 8/02; H04W 76/10
See application file for complete search history.

(56) References Cited

U.S. PATENT DOCUMENTS

| | | |
|---|---|---|
| 8,605,662 B2 | 12/2013 | Shatzkamer et al. |
| 8,655,996 B2 | 2/2014 | Sheth et al. |
| (Continued) | | |

OTHER PUBLICATIONS

Telefonaktiebolaget LM Ericsson, "Packet Core Controller", https://www.ericsson.com/en/portfolio/digital-services/cloud-core/cloud-packet-core/packet-core/controller, downloaded Feb. 14, 2020, 1 page.

*Primary Examiner* — Hassan A Phillips
*Assistant Examiner* — Prenell P Jones

(57) ABSTRACT

Methods for selecting network slice, session management, and user plane functions for user equipment (UE) are described. In one example, a control plane (CP) entity for mobility management may select a CP entity for session management for a session of a UE based on a first set of data items. The CP entity for mobility management may further select a user plane (UP) entity for the session of the UE based on a second set of data items, where second set of data items include at least some of the same data items of the first set. The CP entity for mobility management may send, to the selected CP entity, a message including an identity or indication of the selected UP entity for the session of the UE. The selected CP entity may select the identified or indicated UP entity for use in the session of the UE.

20 Claims, 20 Drawing Sheets

(51) Int. Cl.
*H04W 8/02* (2009.01)
*H04W 48/18* (2009.01)

(56) References Cited

U.S. PATENT DOCUMENTS

| | | |
|---|---|---|
| 8,891,423 B2 | 11/2014 | Shaheen et al. |
| 9,325,582 B2 | 4/2016 | Agrawal et al. |
| 9,571,405 B2 | 2/2017 | Pignataro et al. |
| 9,642,077 B2 | 5/2017 | Mathai et al. |
| 10,009,751 B2 | 6/2018 | Gundavelli et al. |
| 10,064,058 B2 | 8/2018 | Stammers et al. |
| 2012/0044836 A1* | 2/2012 | Sivavakeesar ........ H04W 24/02 370/255 |
| 2014/0029513 A1 | 1/2014 | Takahashi et al. |
| 2015/0131618 A1* | 5/2015 | Chen ..................... H04B 7/15 370/332 |
| 2015/0249999 A1* | 9/2015 | Kaippallimalil .... H04W 40/248 370/329 |
| 2016/0301779 A1 | 10/2016 | Zhi et al. |
| 2016/0353465 A1 | 12/2016 | Vrzic et al. |
| 2017/0054595 A1 | 2/2017 | Zhang et al. |
| 2017/0070892 A1 | 3/2017 | Song et al. |
| 2017/0093749 A1 | 3/2017 | Hoffmann |
| 2017/0303259 A1 | 10/2017 | Lee et al. |
| 2017/0332421 A1 | 11/2017 | Sternberg et al. |
| 2017/0359768 A1 | 12/2017 | Byun et al. |
| 2018/0097894 A1* | 4/2018 | Li ........................ H04L 47/14 |
| 2018/0103128 A1 | 4/2018 | Muscariello et al. |
| 2018/0109632 A1 | 4/2018 | Stammers et al. |
| 2018/0270744 A1 | 9/2018 | Griot et al. |
| 2018/0317086 A1 | 11/2018 | Ben Henda et al. |
| 2019/0098618 A1 | 3/2019 | Lee et al. |
| 2019/0174449 A1 | 6/2019 | Shan et al. |
| 2019/0182875 A1 | 6/2019 | Talebi et al. |
| 2020/0029388 A1* | 1/2020 | Dao ....................... H04W 76/34 |
| 2020/0053803 A1 | 2/2020 | Youn et al. |
| 2020/0059851 A1* | 2/2020 | Kim .................... H04L 41/0806 |
| 2020/0260511 A1* | 8/2020 | Kim ....................... H04W 4/44 |
| 2020/0314950 A1* | 10/2020 | Dao ................... H04W 36/0016 |
| 2020/0329450 A1* | 10/2020 | Youn .................... H04W 60/06 |
| 2021/0211960 A1* | 7/2021 | Ryu ..................... H04W 36/14 |

\* cited by examiner

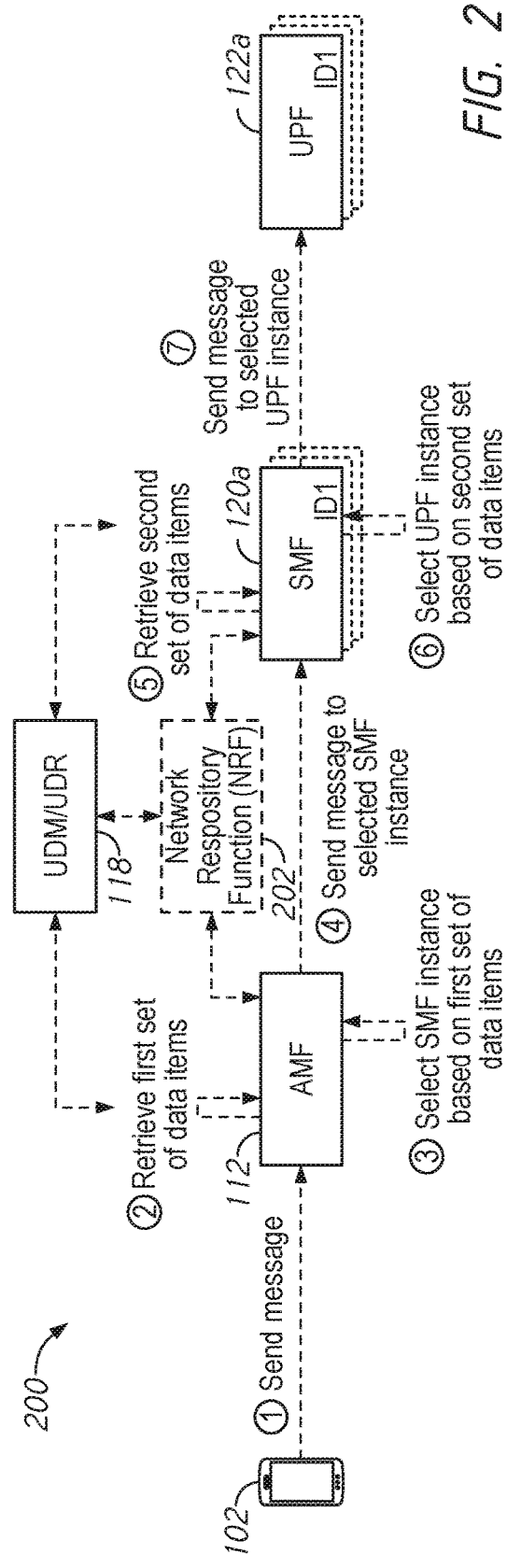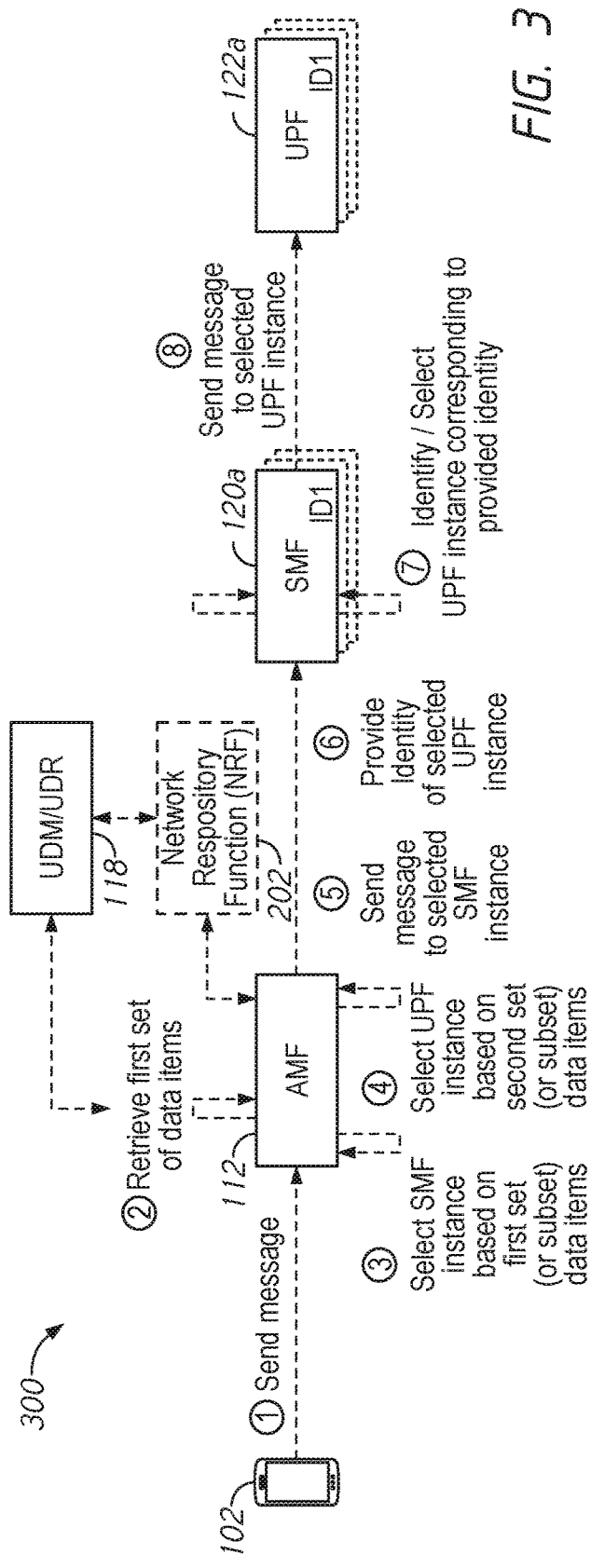

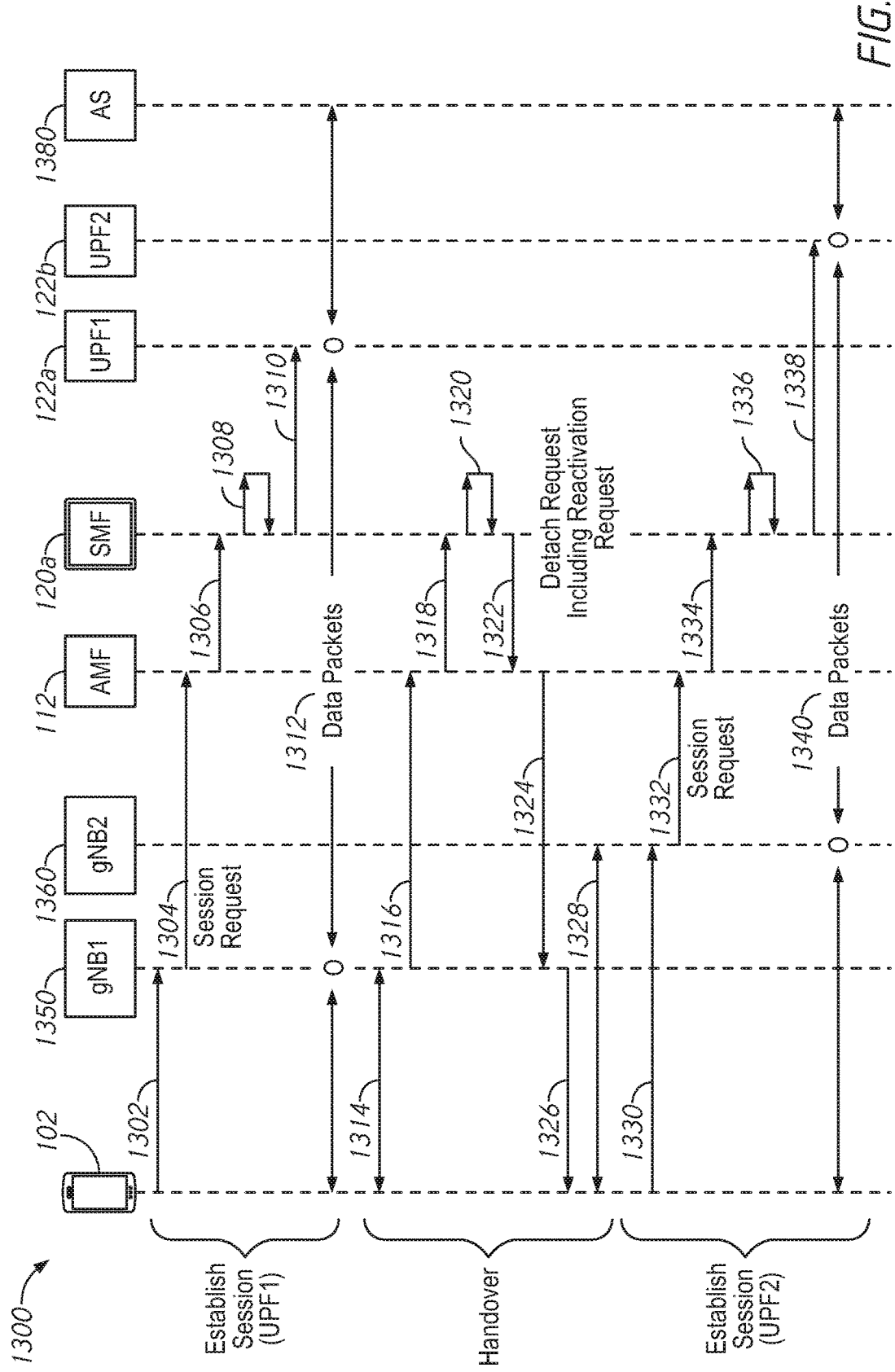

METHODS AND APPARATUS FOR SELECTING NETWORK SLICE, SESSION MANAGEMENT AND USER PLANE FUNCTIONS

CROSS-REFERENCE TO RELATED APPLICATIONS

This application is a continuation of U.S. patent application Ser. No. 15/894,498 filed Feb. 12, 2018, the entirety of which is incorporated herein by reference.

TECHNICAL FIELD

The present disclosure relates generally to the selection of network slice, session management, and user plane functions for mobile networks.

BACKGROUND

There is a need for techniques for selecting network slice, session management, and user plane functions for use in a session for user equipment (UE) in mobile networks, such as 4G/Long Term Evolution (LTE) based mobile networks and 5G mobile networks.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 is a process flow diagram for describing a method of selecting network slice, session management and user plane functions for a session of a user equipment (UE) in the 5G mobile network;

FIG. 3 is a process flow diagram for describing a more efficient method for use in selecting network slice, session management and user plane functions for a session of a UE in the 5G mobile network according to some implementations of the present disclosure;

FIG. 13 is a process flow diagram for describing a method for use in selecting/reselecting a UP entity and/or an IP address for a session for a UE in the 5G mobile network of FIGS. 1A-1B;

Figure 1A:
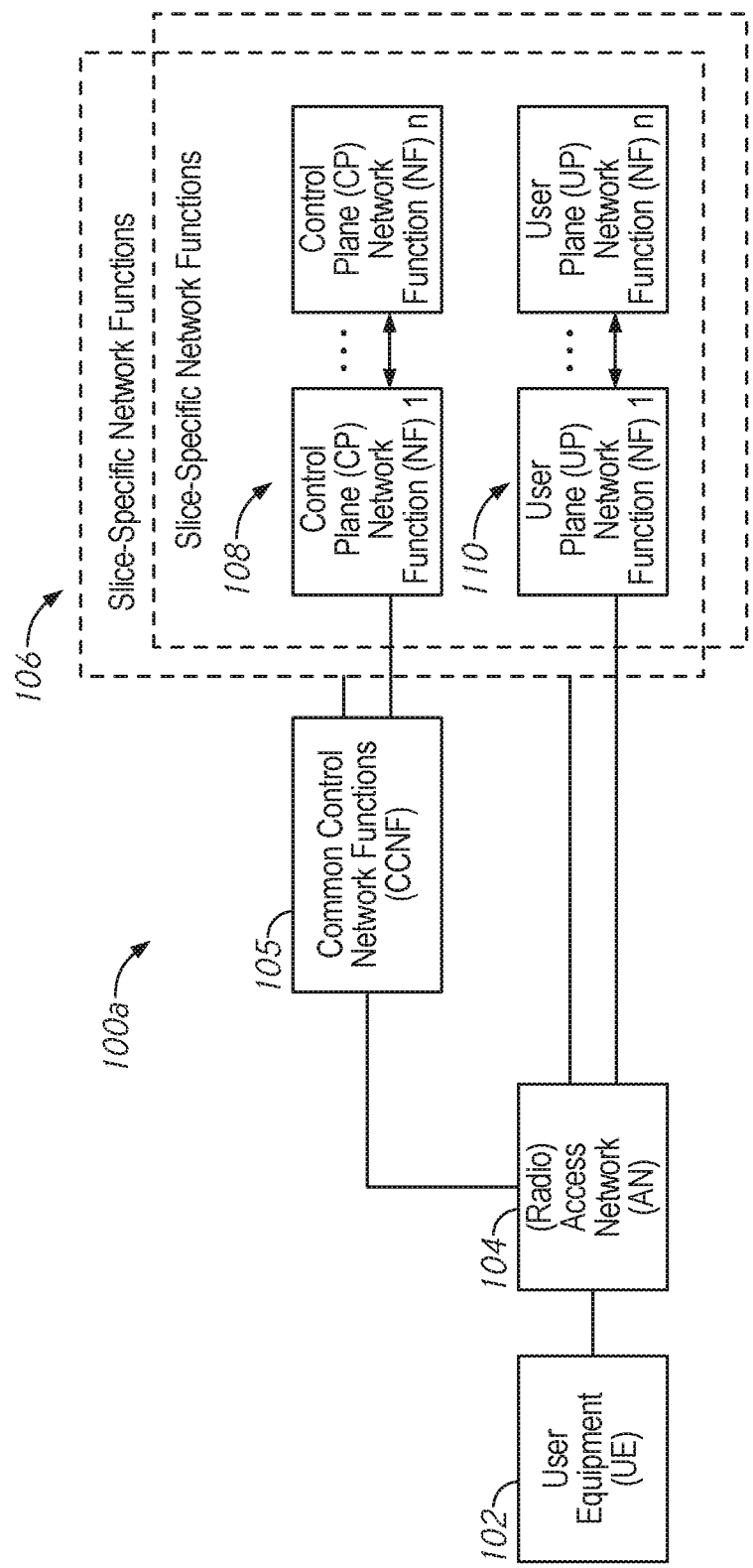
FIG. 1A is an illustration of a basic network architecture of a 5G mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in efficiently selecting network slice, session management and user plane functions for a session for a user equipment (UE) are described herein.

In one illustrative example, a control plane (CP) entity for mobility management may select a CP entity for session management for a session of a user equipment (UE) based on a first set of data items. The CP entity for mobility management may further select a user plane (UP) entity for the session of the UE based on a second set of data items, where second set of data items include at least some of the same data items of the first set. The CP entity for mobility management may send, to the selected CP entity for session management, a message including an identity or indication of the selected UP entity for the session of the UE. The selected CP entity for session management may choose the identified or indicated UP entity in the message for use in the session of the UE.

In some implementations, the CP entity for mobility management is an access and mobility management function (AMF) of a 5G mobile network, where the selected CP entity for session management is a session management function (SMF) instance and the selected UP entity is a user plane function (UPF) instance. Here, the identity or indication of the selected UPF instance may be included in a data field for a data network name (DNN) of a create session request message which is sent to the selected SMF instance. In some implementations, the data retrieval and NF selection functions are delegated to a network repository function (NRF) of the 5G mobile network.

In alternative implementations, the CP entity for mobility management is a mobility management entity (MME) of a 4G/LTE based mobile network, where the CP entity for session management is a gateway-control plane (GW-C). Here, the identity or indication of the selected UP entity may be included in a data field for an access point name (APN) of a create session request message which is sent to the selected GW-C.

In another illustrative example of techniques of the present disclosure, a CP entity for session management may receive, from a CP entity for mobility management, a message which includes a create session request for creating a session for a UE. The CP entity for session management may identify from the message an identity or indication of a user plane (UP) entity. The CP entity for session management may select, for use in the session, a UP entity corresponding to or based on the identity or indication of the UP entity from the message. The CP entity for session management may send, to the selected UP entity, a message which includes a session establishment request for establishing the session.

In some implementations, the CP entity for session management may be a session management function (SMF) of a 5G mobile network, where the identity or indication of the selected UP entity is extracted from a data field for a data network name (DNN) of the create session request. Alternatively, the CP entity for mobility management may be a gateway (GW) control plane (CP) entity (GW-C) of a 4G/LTE based mobile network, where the identity or indication of the selected UP entity is extracted from a data field for an access point name (APN) of the create session request.

Example Embodiments

FIG. 1A is an illustration of a basic network architecture 100a of a 5G mobile network. The network architecture 100a of the 5G mobile network is configured to support network slicing. In general, network architecture 100a includes common control network functions (CCNF) 105 and a plurality of slice-specific core network functions 106. A user equipment (UE) 102 may obtain access to the mobile network via an access network (AN) 104, which may be a radio access network (RAN).

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
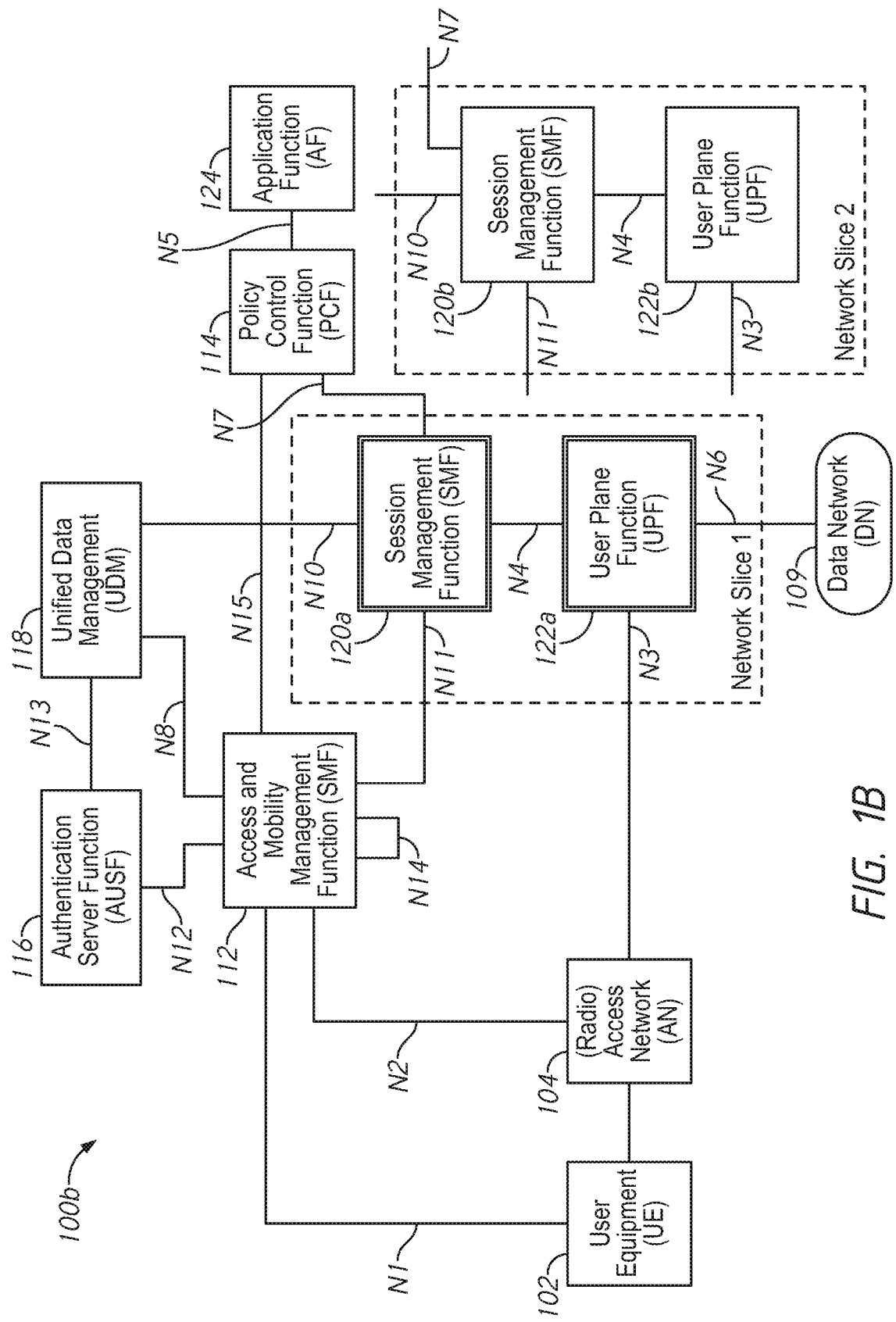
FIG. 1B is an illustration of a more detailed network architecture of the 5G mobile network of FIG. 1A.

FIG. 1B is an illustration of a more detailed network architecture 100b of the 5G mobile network of FIG. 1A. As provided in 3GPP standards for 5G (e.g. 3GPP 23.501), network architecture 100b for a 5G mobile network may include an authentication server function (AUSF) 116, a unified data management (UDM) 118 (having a unified data repository or UDR), an AMF 112, a policy control function (PCF) 114, an SMF 120a, and a UPF 122a. PCF 114 may connect with one or more application functions such as an application function (AF) 124. UPF 122a may connect with one or more data networks (DNs) 109 to which an application server (AS) may be connected. A plurality of interfaces N1 through N15 shown in FIG. 1 may define the communications and/or protocols between each of the entities, as described in the relevant (evolving) standards documents.

UPF 122a is part of the user plane and all other NFs (i.e. AMF 112, SMF 120a, PCF 114, AUSF 116, and UDM 118) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling.

As illustrated in FIG. 1B, NFs such as SMF 120a and UPF 122a of FIG. 1B may be provided as specific instances in a first network slice (e.g. network slice 1). Additional instances of NFs for additional network slices may be provided as well, as illustrated by SMF 120b and UPF 122b provided as additional specific instances in a second network slice (e.g. network slice 2).

Per the standards documents, the network generally deploys a network slice based on a network slice selection assistance information (NSSAI) provided by UE 102. During an initial attach procedure by UE 102, the NSSAI is used by RAN 104 to select the CCNF 105. The NSSF in CCNF 105 selects the network slice instance. In general, network slice instance selection may be based on the NSSAI, the data network name (DNN) of the session, subscription data of UE 102, and other parameters. An attach accept message from the network includes an accepted or allowed NSSAI for UE 102.

FIG. 2 is a process flow diagram 200 for describing a method of selecting network slice, session management and user plane functions for use in a session of a UE.

In FIG. 2, UE 102 may send to AMF 112 a message which includes a session establishment request (step 1 of FIG. 2). The session establishment request is for use in creating a packet data unit (PDU) session for UE 102. AMF 112 may retrieve a first set of data items to assist in establishing a session that is appropriate for UE 102 (step 2 of FIG. 2). The first set of data items may include, for example, subscription data, profile data, an identity of a dedicated core network (DCN), and a hint from UE 102. At least some of the first set of data items may be retrieved from a DB (e.g. from a Unified Data Repository or UDR of UDM 118).

AMF 112 may select an SMF instance for the session based on the first set of data items (step 3 of FIG. 2). Here, an identity of the selected SMF instance 120a is obtained. The selected SMF instance 120a will be used to carry signaling for the session for UE 102. AMF 112 may select an SMF instance by consulting a network repository function (NRF) 202 which stores/provides a list of available network functions together with the services offered by those functions. In some implementations, NRF 202 may perform steps 2 and 3 (i.e. AMF 112 may delegate the data retrieval and selection of the SMF instance to NRF 202). Using the identity of the selected SMF instance, AMF 112 may send to the selected SMF 120a a message which includes a create session request (step 4 of FIG. 2).

SMF 120a may retrieve a second set of data items to assist in establishing the PDU session for UE 102 (step 5 of FIG. 2). The second set of data items may include, for example, subscription data, UP capacity, UP location, and path latency. At least some of the second set of data items may be retrieved from a DB (e.g. from the UDR of UDM 118).

SMF 120a may select a UPF instance for the session based on the second set of data items (step 6 of FIG. 2). Here, an identity of the selected UPF instance 122a is obtained. SMF 120a may select a UPF instance by consulting NRF 202 which stores/provides a list of available functions together with the services offered by those functions. In some implementations, NRF 202 may perform steps 5 and 6 (i.e. SMF 120a may delegate the data retrieval and selection of the UPF instance to NRF 202). Using the identity, SMF 120a may send to the selected UPF 122a a message which includes a session establishment/modification request (step 7 of FIG. 2). The selected UPF 122a will be used to carry traffic of the session for UE 102.

Note that the first and the second set of data items in the process of FIG. 2 may include at least some or many of the same data items (e.g. data items retrieved from one or more databases).

FIG. 3 is a process flow diagram 300 for describing a more efficient method of selecting network slice, session management and user plane functions for use in a session of a UE according to some implementations of the present disclosure. Here, the entities, functions, and interfaces of the 5G mobile network of FIGS. 1a and 1b may be configured in accordance with the relevant (evolving) standards, with modification, adaptation, and/or additions provided in accordance with the techniques of the present disclosure.

In FIG. 3, UE 102 may send to AMF 112 a message which includes a session establishment request (step 1 of FIG. 3). The session establishment request is for use in establishing a PDU session for UE 102. AMF 112 may retrieve a set of data items to assist in establishing a PDU session that is appropriate for UE 102 (step 2 of FIG. 3). At least some of the set of data items may be retrieved from one or more databases (e.g. from a Unified Data Repository of UDM 118).

The set of data items may include a first set (or subset) of data items for selecting an appropriate SMF instance, and a second set (or subset) of data items for selecting an appropriate UPF instance. Although the first and the second sets (or subsets) of data items may be different and distinct sets (or subsets) of data items, the first and the second sets (or subsets) of data items may include at least some or many of the same data items.

AMF 112 may select an SMF instance for the session based on the first set (or subset) of these data items (step 3 of FIG. 3). The first set (or subset) of data items may include, for example, subscription data, profile data, an identity of a DCN, and a hint from UE 102. The SMF instance may be selected by performing a first function or algorithm which uses the first set (or subset) of data items as inputs. Here, an identity of the selected SMF instance 120a is obtained. The selected SMF instance 120a will be used to carry signaling for the session for UE 102.

AMF 112 may further select a UPF instance for the session based on the second set (or subset) of these data items (step 4 of FIG. 3). The second set (or subset) of data items may include, for example, subscription data, policy data, identity of the selected SMF, UP capacity, UP location, load, and path latency. The UPF instance may be selected by performing a second function or algorithm which uses the second set (or subset) of data items as inputs. Here, an identity of the selected UPF instance 122a is obtained. The selected UPF 122a will be used to carry traffic of the session for UE 102.

Note that AMF 112 may select an SMF instance and/or a UPF instance by consulting NRF 202 which stores/provides a list of available network functions together with the services offered by those functions. In some implementations, NRF 202 may perform steps 2, 3, and/or 4 (i.e. AMF 112 may delegate the data retrieval and selection of the SMF instance and/or the UPF instance to NRF 202).

In some implementations, data items (e.g. subscription data and policy data) are retrieved only one time (i.e. a single time) for the selection of both the SMF instance and the UPF instance (i.e. for steps 3 and 4 of FIG. 3).

Using the identity of the selected SMF instance 120a, AMF 112 may send to the selected SMF 120a a message which includes a create session request (step 5 of FIG. 3). AMF 112 may also provide the identity or indication of the selected UPF instance 122a to SMF 120 (step 6 of FIG. 3). In some implementations, the message in step 5 includes the identity or indication of the selected UPF instance 122a.

SMF instance 120a may receive the message from AMF 112 and identifies the AMF-selected UPF instance 122a for the session for UE 102. Using the identity of selected UPF instance 122a, SMF 120a may send to the selected UPF 122a a message which includes a session establishment/modification request (step 7 of FIG. 3). Again, selected UPF 122a will be used to carry traffic of the session for UE 102.

As is apparent, the selected UPF 122a for the session is identified by the SMF 120a without the SMF 120a having to separately retrieve data items and perform selection. The first and the second sets of data items may include some or many of the same data items (e.g. retrieved from one or more databases), and therefore performing the selection of SMF and UPF instances together at the AMF 112 provides for increased processing efficiency.

A few examples of UPF instance selection are noted for illustration. As one example, an edge node may be selected for a subscribed video delivery service. On the other hand, a different type of edge node may be selected for an AR-type service where low latency is a more important factor. As another example, a more centralized UPF may be selected when a user plane offering complex service chaining is required for a service.

Figure 4:
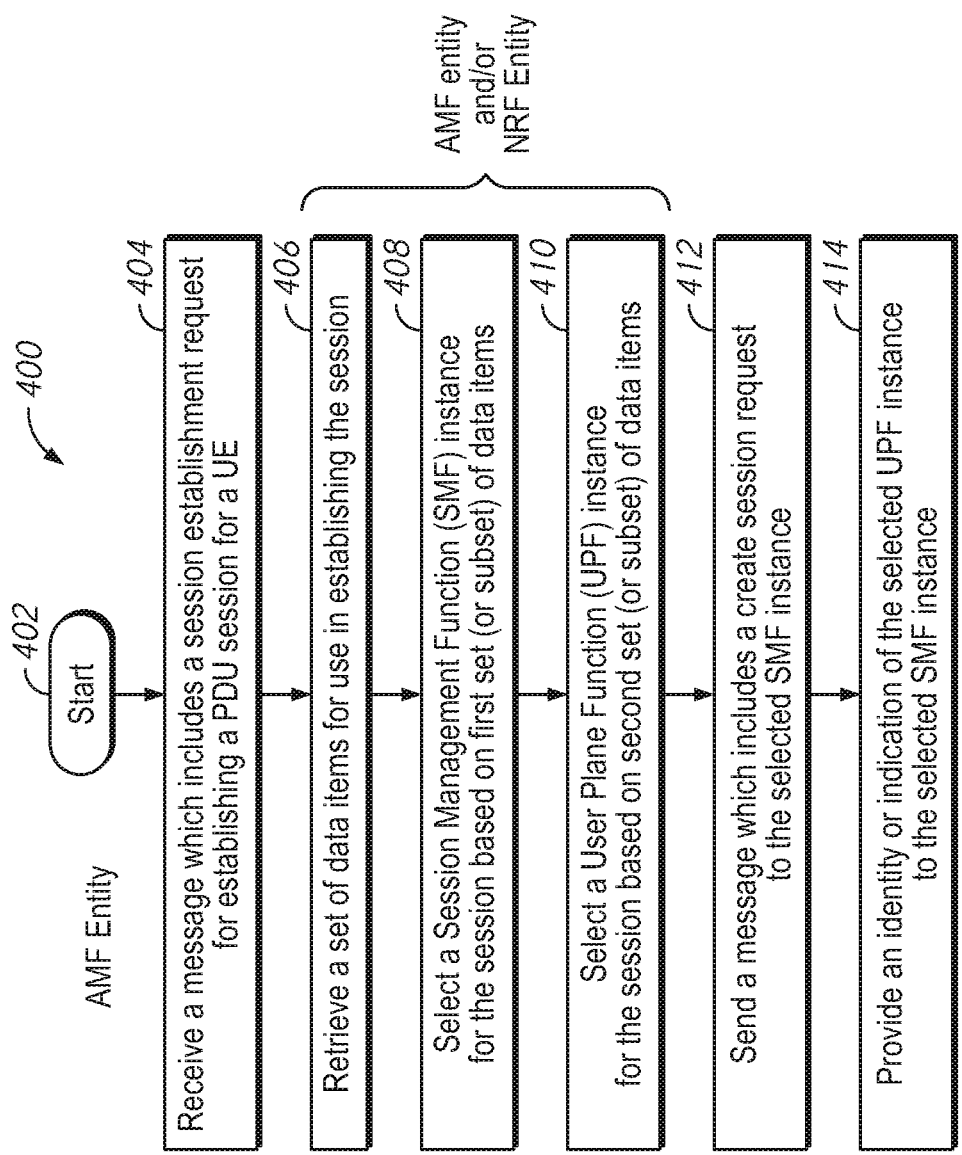
FIG. 4 is a flowchart for describing a method of an access and mobility management function (AMF) entity for use in selecting network slice, session management and user plane functions for a session of a UE according to some implementations of the present disclosure.

FIG. 4 is a flowchart 400 for describing a method an efficient method of selecting network slice, session management and user plane functions for a session of a UE according to some implementations of the present disclosure. The method may be performed by a NF entity, such as an AMF entity, of a 5G mobile network.

Beginning at a start block 402 of FIG. 4, the AMF entity may receive from a UE a message which includes a session establishment request (step 404 of FIG. 4)). The session establishment request may be for use in establishing a PDU session for the UE. AMF 112 may retrieve a set of data items to assist in establishing a PDU session that is appropriate for UE 102 (step 406 of FIG. 4). The set of data items may include, for example, subscription data and profile data associated with UE 102. At least some of the data items may be retrieved from one or more databases (e.g. from a UDR of UDM 118).

The set of data items may include a first set (or subset) of data items for selecting an appropriate SMF instance and a second set (or subset) of data items for selecting an appropriate UPF instance. Although the first and the second sets (or subsets) of data items may be different and distinct sets (or subsets) of data items, the first and the second sets of data items may include at least some or many of the same data items.

The AMF entity may select an SMF instance for the session based on the first set of data items (step 408 of FIG. 4). The first set of data items may include, for example, subscription data, profile data, an identity of a DCN, and a hint from UE 102. The SMF instance may be selected by performing a first function or algorithm which uses the first set of data items as inputs. Here, an identity of the selected SMF instance is obtained. The selected SMF instance will be used to carry the signaling for the session for UE.

The AMF entity may further select a UPF instance for the session based on the second set of data items (step 410 of FIG. 4). The second set of data items may include, for example, subscription data, policy data, identity of the selected SMF, UP capacity, UP location, load, and path latency. The UPF instance may be selected by performing a second function or algorithm which uses the second set of data items as inputs. Here, an identity of the selected UPF instance is obtained. The selected UPF will be used to carry traffic of the session for the UE.

Note that the AMF entity may select an SMF instance and/or a UPF instance by consulting an NRF which stores/provides a list of available network functions together with the services offered by those functions. In some implementations, the NRF may perform steps 406, 408, and 410 of FIG. 4 (i.e. the AMF entity may delegate the data retrieval and selection of the SMF instance and/or the UPF instance to the NRF).

In some implementations, data items (e.g. subscription data and policy data) are retrieved only one time (i.e. a single time) for the selection of both the SMF instance and the UPF instance (i.e. for steps 408 and 410 of FIG. 4).

Using the identity of the selected SMF instance, the AMF entity may send to the selected SMF instance a message which includes a create session request (step 412 of FIG. 4). AMF 112 may also provide the identity or indication of the selected UPF instance to the selected SMF instance (step 414 of FIG. 4). The selected UPF instance will be used to carry traffic in the session for the UE. In some implementations, the message of step 412 includes the identity or indication of the selected UPF instance. The selected SMF instance may receive the message from the AMF entity and identify the AMF-selected UPF instance for use in the session for the UE. In some implementations, steps 412 and 414 are performed with use of the technique described below in relation to FIG. 5.

As is apparent, a suitable, selected UPF instance for the session is identified by the SMF without the SMF having to separately retrieve data items and perform the selection. The first and the second sets of data items may include some or many of the same data items (e.g. retrieved from one or more databases), and therefore performing the selection of SMF and UPF instances together at the AMF provides for increased processing efficiency.

Figure 5:
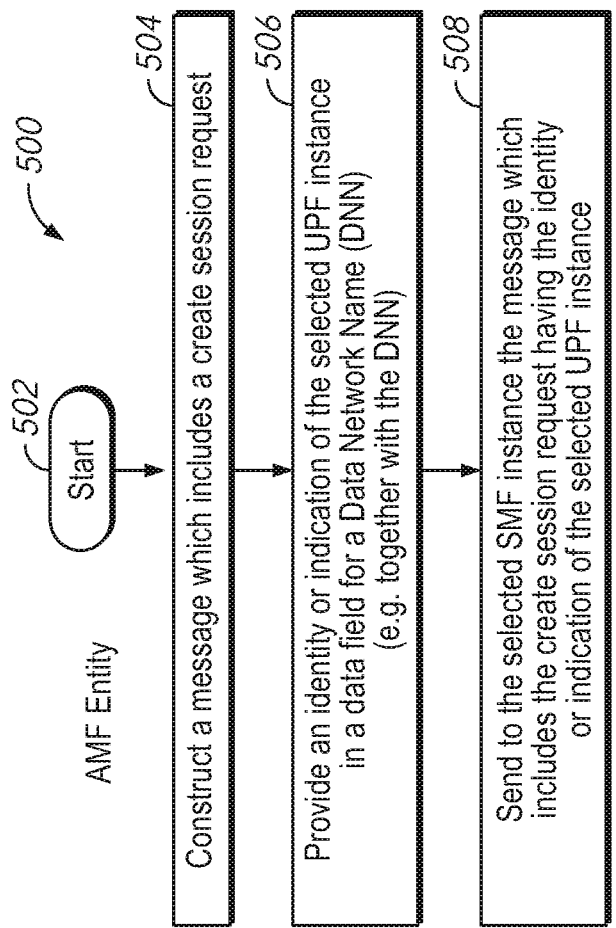
FIG. 5 is a flowchart for describing a method of an AMF entity for use in selecting network slice, session management and user plane functions for a session of a UE according to some implementations of the present disclosure.

FIG. 5 is a flowchart 500 for describing a method for use in selecting network slice, session management and user plane functions for a session of a UE according to some implementations of the present disclosure. Again, the method may be performed by an NF entity, such as an AMF entity, of a 5G mobile network. The method of FIG. 5 involves a technique which may be used to perform steps 412 and 414 of FIG. 4.

In FIG. 5, the AMF entity may begin the method after the selection of an SMF instance and the selection of a UPF instance for the session for the UE (e.g. see steps 406, 408, and 410 of FIG. 4). Beginning at a start block 502 of FIG. 5, the AMF entity may construct a message which includes a create session request (step 504 of FIG. 5). The create session request is for use in creating a PDU session for the UE. The AMF entity may provide an identity of indication of the selected UP instance in the message (step 506 of FIG. 5). More particularly, the identity or indication of the selected UPF instance may be provided in a data field for a DNN in the create session request. In some implementations, the identity or indication of the selected UPF instance may be provided together with the DNN in the data field. The AMF entity may send to the selected SMF instance the message which includes the create session request having the identity of indication of the selected UPF instance (step 508 of FIG. 5).

Figure 6:
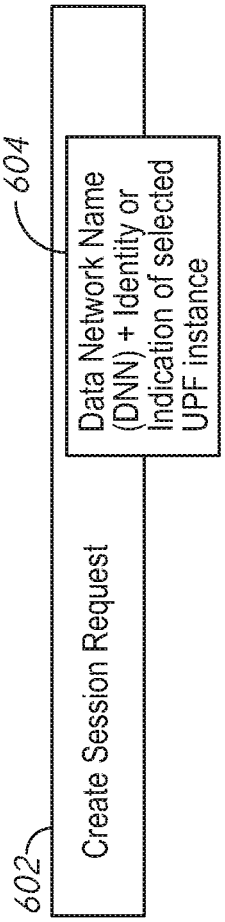
FIG. 6 is an illustrative representation of a message which includes a create session request according to some implementations of the present disclosure.

An illustrative example of the constructed message of steps 504 and 506 of FIG. 5 is shown in FIG. 6. In FIG. 6, a message 602 which includes a create session request 602 having a data field 604 for a DNN which includes the DNN and the identity or indication of the selected UPF instance is shown.

In some implementations, the identity or indication of the selected UPF instance may be inserted as part of the DNN. As one example, if the DNN is "internet.operator.com" and the selected UPF instance is "AR2" (of AR1, AR2, ... ARn), then data field 604 may be internet-AR2.operator.com. The AMF entity may insert or otherwise provide "AR2" in data field 604, and the SMF entity may extract "AR2" from data field 604. In some alternative implementations, the DNN includes metadata which indicates the selected UPF instance.

Figure 7:
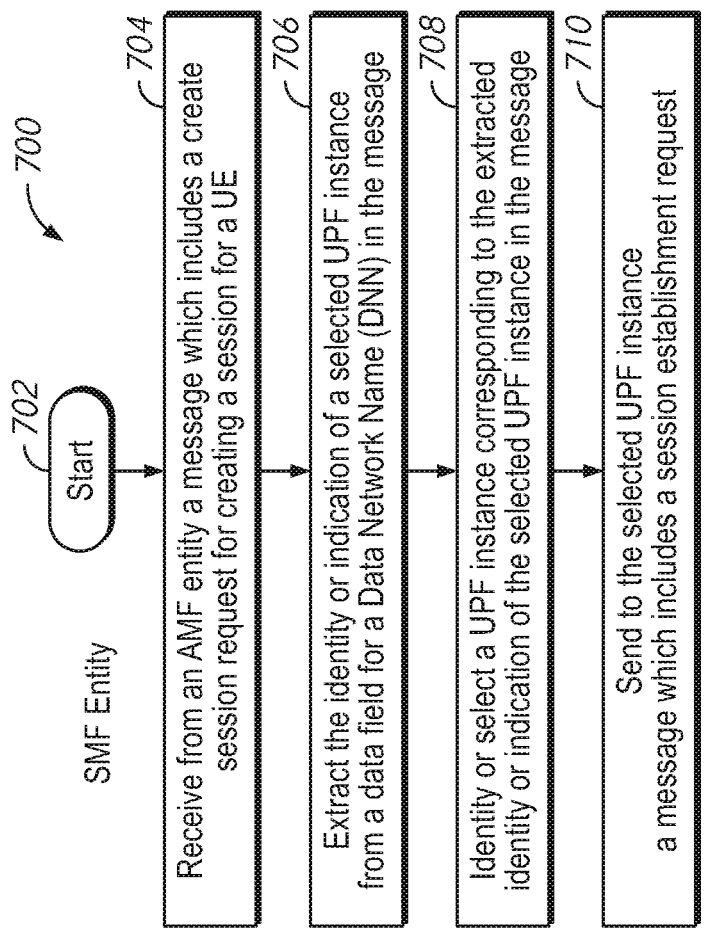
FIG. 7 is a flowchart for describing a method of a session management function (SMF) entity for use in selecting network slice, session management and user plane functions for a session of a UE according to some implementations of the present disclosure.

FIG. 7 is a flowchart 700 for describing a method for use in selecting network slice, session management and user plane functions for a session of a UE according to some implementations of the present disclosure. The method of FIG. 7 may be performed by an NF entity, such as an SMF entity, of a 5G mobile network. The method of FIG. 7 involves a technique at an SMF entity which may be performed in combination with the technique at the AMF entity of FIGS. 4, 5, and 6. More particularly, the method of FIG. 7 may begin after steps 412 and 414 of FIG. 4, and/or step 508 of FIG. 5.

Beginning at a start block 702 of FIG. 7, an SMF entity may receive from an AMF entity a message which includes a create session request (step 704 of FIG. 7). The create session request is for use in creating the PDU session for the UE. The SMF entity may extract from the message an identity or indication of a selected UPF instance (step 706 of FIG. 7). More particularly, the SMF entity may extract the identity or indication of the selected UPF instance from a data field for a data network name (DNN). The SMF entity may identity or select a UPF instance corresponding to the extracted identity or indication from the message (step 708 of FIG. 7). The SMF entity may send to the identified UPF instance a message which includes a session establishment/modification request (step 710 of FIG. 7). The selected UPF will be used to carry traffic of the session for the UE.

Figure 8:
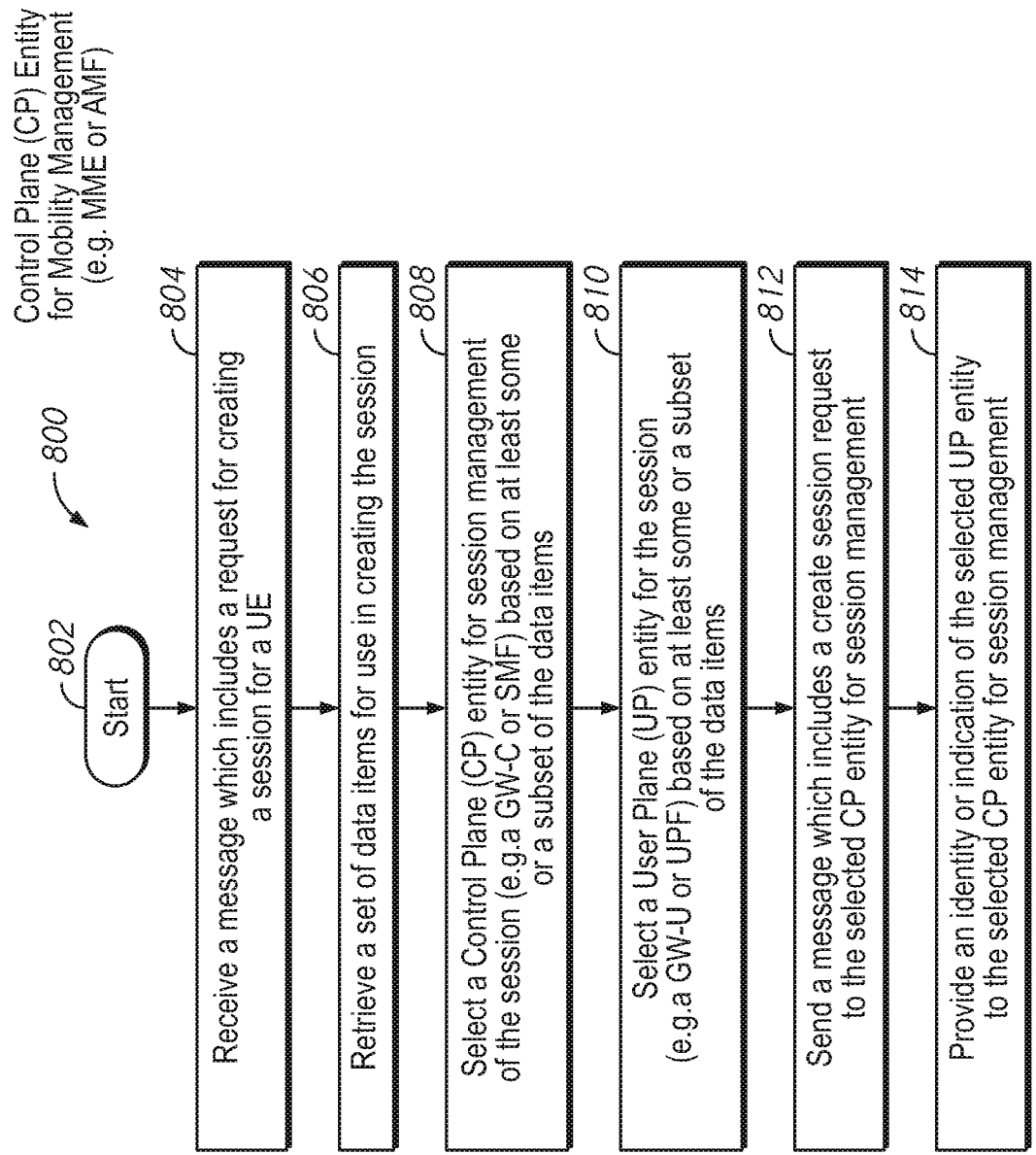
FIG. 8 is a flowchart for more generally describing the technique of FIGS. 3-7 which may be performed by an entity in the 5G mobile network or a 4G/Long Term Evolution (LTE) mobile network.

FIG. 8 is a flowchart 800 for more generally describing the technique of FIGS. 3-7 and its applicability to not only a 5G mobile network, but to other networks such as a 4G/Long Term Evolution (LTE) network. In general, the technique of FIGS. 3-7 applied to an LTE-based network replaces the AMF entity of the 5G mobile network with a mobility management entity (MME), and the SMF entity of the 5G mobile network with a gateway (GW) control plane (C) entity (GW-C). A control plane (CP) entity for mobility management (e.g. an AMF or an MME) may perform the method of FIG. 8.

Beginning at a start block 802 of FIG. 8, a message which includes a request for creating a session for a UE may be received (step 804 of FIG. 8). A set of data items for use in creating the session for the UE may be retrieved (step 806 of FIG. 8). A CP entity for session management (e.g. an SMF or a GW-C) may be selected for the session based on some or a subset of the retrieved data items (step 808 of FIG. 8). In addition, a user plane (UP) entity (e.g. a UPF or GW-U) may be selected for the session based on some of a subset of the retrieved data items (step 810 of FIG. 8). A message which includes a create session request may be sent to the selected CP entity for session management (i.e. the SMF or GW-C) (step 812 of FIG. 8). An identity or indication of the selected UP entity is provided to the selected CP entity for session management (step 814 of FIG. 8). The identity or indication may be provided in a message, such as a message which includes a create session request (e.g. in a data field for a data network name (DNN) or an application point name (APN)). The selected CP entity for session management may identity or select a UP entity for the session based on the provided identity or indication, or may identity or select a UP entity that corresponds to the provided identity or indication.

Additional methods and apparatus are now described in relation to FIGS. 9-15. The additional methods and apparatus may be for use in selecting/reselecting a user plane (UP) entity and/or an IP address for a session for a UE. The techniques may alternatively be referred to as techniques for "re-siting" an IP anchor, where re-siting is a process of re-selecting the UP function or entity such that it is more geographically appropriate for the session. Here, the IP anchor may be re-sited to a new, closer (e.g. the closest) UP. The present techniques may also provide the desired effect of changing the IP address on UP re-siting.

Figure 9:
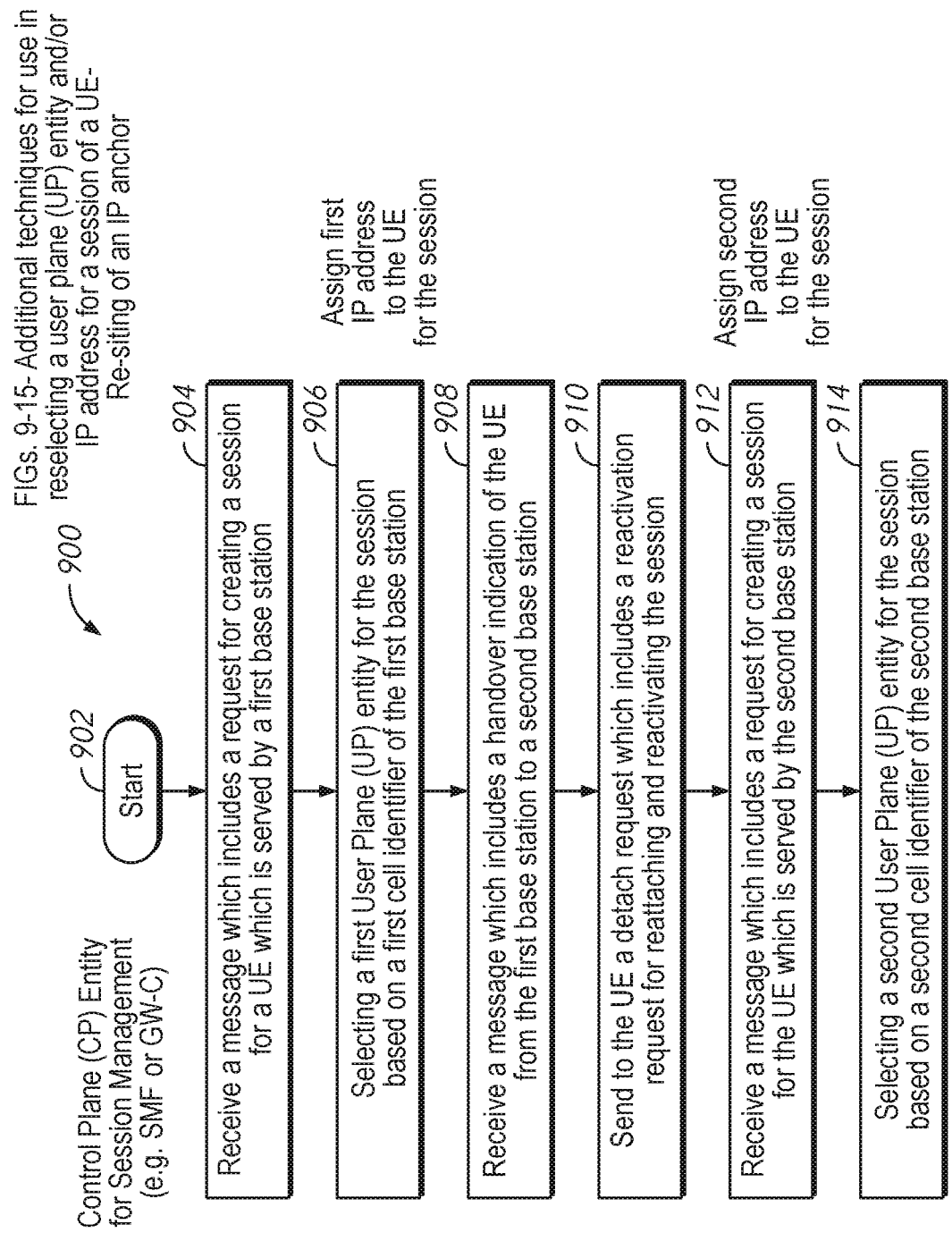
FIG. 9 is a flowchart for describing an additional method of the present disclosure according to some implementations, which is a method for use in selecting/reselecting a UP entity and/or an IP address for a session for a UE, which may be performed by a CP entity for session management.

For illustrating the additional techniques of the present disclosure, FIG. 9 is a flowchart 900 for describing a method for use in selecting/reselecting a UP entity (e.g. an UPF or GW-U) and/or an IP address for a session for a UE in a mobile network. The method of FIG. 9 may be performed by a control plane (CP) entity for session management (e.g. an SMF or GW-C).

Beginning at a start block 902 of FIG. 9, a message which includes a request for creating a session for a UE may be received (step 904 of FIG. 9). The UE is being served by a first base station in a first cell. A first UP entity may be selected for the session based on a (received) first cell identifier of the first base station (step 906 of FIG. 9). The first cell identifier may be, for example, a cell ID or a cell global identification (eCGI). In addition, a first IP address may be selected and assigned to the UE for the session, and this first IP address is sent to the UE for configuration. The first IP address may be selected from a first pool of IP addresses allocated to the selected first UP entity.

In some implementations, the selection in step 906 may be performed with use of a mapping table which includes a plurality of cell identifiers mapped to a respective plurality of UP identifiers of UP entities. Each cell identifier may correspond to a UP identifier of a UP entity; alternatively, each one of a plurality of sets of cell identifiers of a region may correspond to a UP identifier of a UP entity. In some implementations, the selection in step 906 may be performed by selecting the UP having the UP identifier that corresponds to the received cell identifier with reference to the mapping table. In other implementations, the selection in step 906 may be performed based on factors or considerations in addition to the received cell identifier and/or selected (e.g. suggested or prioritized) user plane. Mapping and mapping tables are illustrated in more detail later in relation to FIGS. 12A-12B.

The UE may be relocated to a second cell of a second base station. A message which includes a handover indication of a handover of the UE from the first base station to the second base station may be received (step 908 of FIG. 9). The message may be or include a modify bearer request which includes a second cell identifier (e.g. a cell ID, or eCGI) of the second base station. Here, it is detected that the UE has changed cells or regions. Reference to the mapping table may be made for such detection.

In response, a message which includes a detach request including a reactivation request may be sent to the UE (step 910 of FIG. 9). This message may instruct the UE to disconnect and re-attach to the network, and re-establish the connection. The message may include, for example, a detach request with a cause value which indicates "reactivation requested" (e.g. cause value=39).

The UE may respond to the message by detaching and reattaching to the network with a (new) request for (re-) creating a session. Accordingly, a message which includes a request for creating a session for a UE may be received (step 912 of FIG. 9). The UE is being served by the second base station in the second cell. A second UP entity may be selected for the session based on a (received) second cell identifier of the second base station (step 914 of FIG. 9). The second cell identifier may be, for example, a cell ID or a eCGI. In addition, a second IP address may be selected and assigned to the UE for the newly-created session, and this second IP address is sent to the UE for configuration. The second IP address may be selected from a second pool of IP addresses allocated to the selected second UP entity.

In some implementations, the selection in step 914 may be performed with use of the mapping table which includes the plurality of cell identifiers mapped to the respective plurality of UP identifiers of UP entities. In some implementations, the selection in step 914 may be performed by selecting the UP having the UP identifier that corresponds to the received cell identifier with reference to the mapping table. In other implementations, the selection in step 914 may be performed based on factors or considerations in addition to the received cell identifier and/or selected (e.g. suggested or prioritized) UP. Again, mapping and mapping tables are illustrated in more detail later in relation to FIGS. 12A-12B.

In some implementations of FIG. 9, step 910 (and resulting steps 912 and 914) is performed (e.g. only) if an identified latency of communications in the session is outside of a threshold latency value. Also in some implementations of FIG. 9, step 910 (and resulting steps 912 and 914) is performed (e.g. only) if communications in the session are substantially inactive or outside of a communication activity threshold value; here, the request for detachment may be delayed until communications in the session are substantially inactive. Further in some implementations of FIG. 9, step 910 is performed based on one or more other factors or parameters in addition to handover and/or use of the mapping table.

Figure 10:
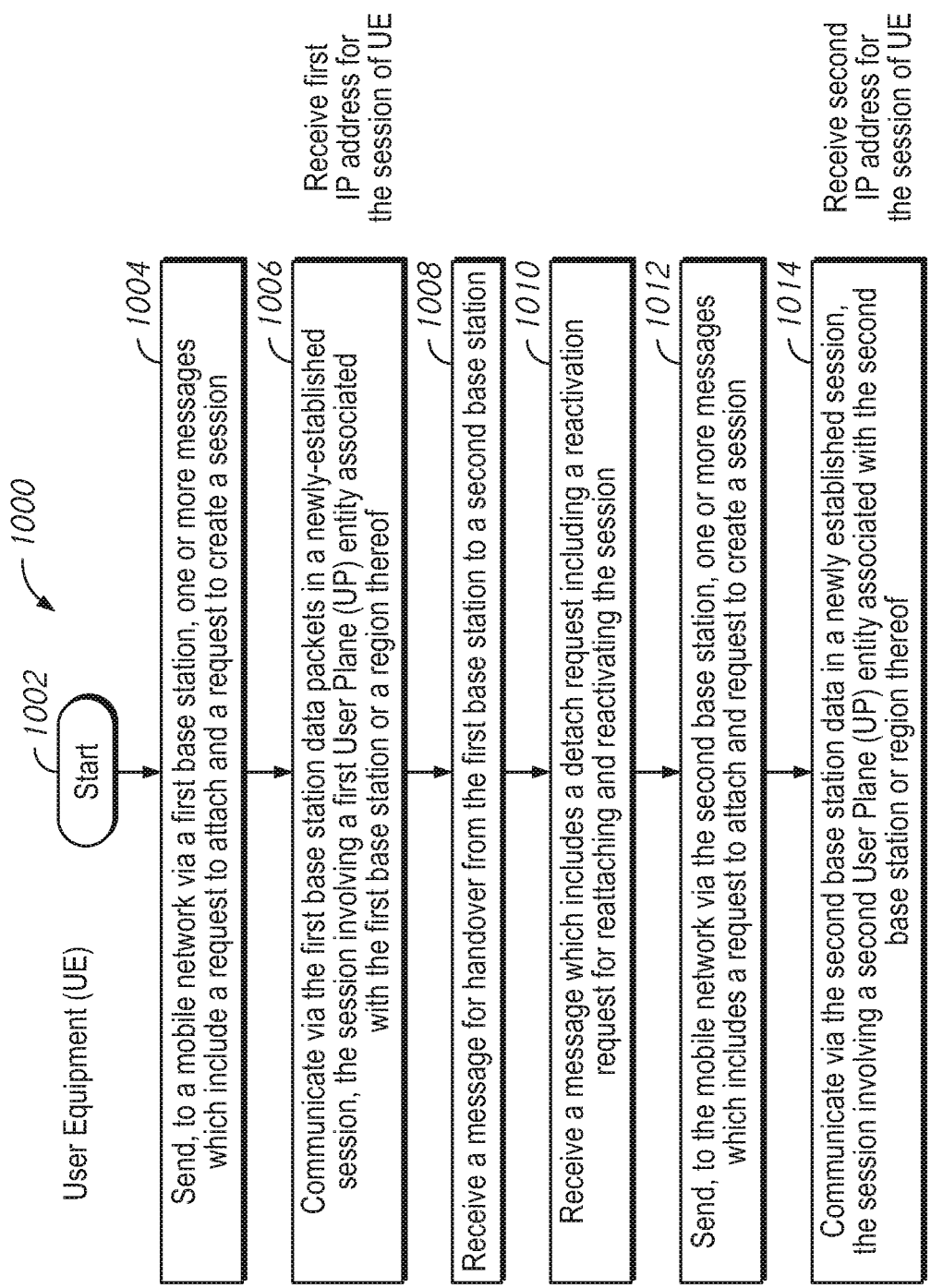
FIG. 10 is a flowchart for describing an additional method for use in selecting/reselecting a UP entity and/or an IP address for a session for a UE, which may be performed by the UE in combination with the method of FIG. 9.

FIG. 10 is a flowchart 1000 for describing a method for use in selecting/reselecting a UP entity and/or an IP address for a session for a UE, which may be performed by the UE, and may be performed by the UE in combination with the method of the CP entity of FIG. 9 previously described.

Beginning at a start block 1000 of FIG. 10, one or more messages which include a request to attach and a request to create a session are sent to a mobile network via a first base station (step 1004 of FIG. 10). A connection and session are established, where data packets are communicated via the first base station (step 1006 of FIG. 10). The newly-created session involves a first UP entity associated with the first base station or a region thereof (e.g. selected by the CP entity for session management with use of the mapping table described herein). The session also involves use of a first IP address that is received and configured in the UE; the first IP address may be selected from a first pool of IP addresses allocated to the selected first UP entity.

The UE may be relocated to a second cell of a second base station. A message which includes a handover instruction for a handover of the UE from the first base station to the second base station may be received (step 1008 of FIG. 10). The UE may now be served by the second base station in the second cell. Next, a message which includes a detach request including a reactivation request may be received (step 1010 of FIG. 10). This message may instruct the UE to disconnect and re-attach to the network, and re-establish the connection. The message may include, for example, a detach request with a cause value which indicates "reactivation requested" (e.g. cause value=39).

The UE may respond to the message by detaching and reattaching to the network with a (new) request for (re-)creating a session. Accordingly, one or more messages which include a request to attach and a request to create a session may be sent to a mobile network via the second base station (step 1012 of FIG. 10). A new connection and new session are established, where data packets are communicated via the second base station (step 1014 of FIG. 10). The newly-created session involves a second UP entity associated with the second base station or a region thereof (e.g. selected by the CP entity for session management with use of the above-described mapping table). The session may also involve use of a second IP address that is received and configured in the UE; the second IP address may be selected from a second pool of IP addresses allocated to the selected second UP entity.

In some implementations of FIG. 10, step 1010 (and resulting steps 1012 and 1014) is performed (e.g. only) if an identified latency of communications in the session is outside of a threshold latency value. Also in some implementations of FIG. 10, step 1010 (and resulting steps 1012 and 1014) is performed (e.g. only) if communications in the session are substantially inactive or outside of a communication activity threshold value; where the request for detachment may be delayed until communications in the session are substantially inactive. Further in some implementations of FIG. 10, step 1010 is performed based on one or more other factors or parameters in addition to handover and/or use of the mapping table.

Figure 11:
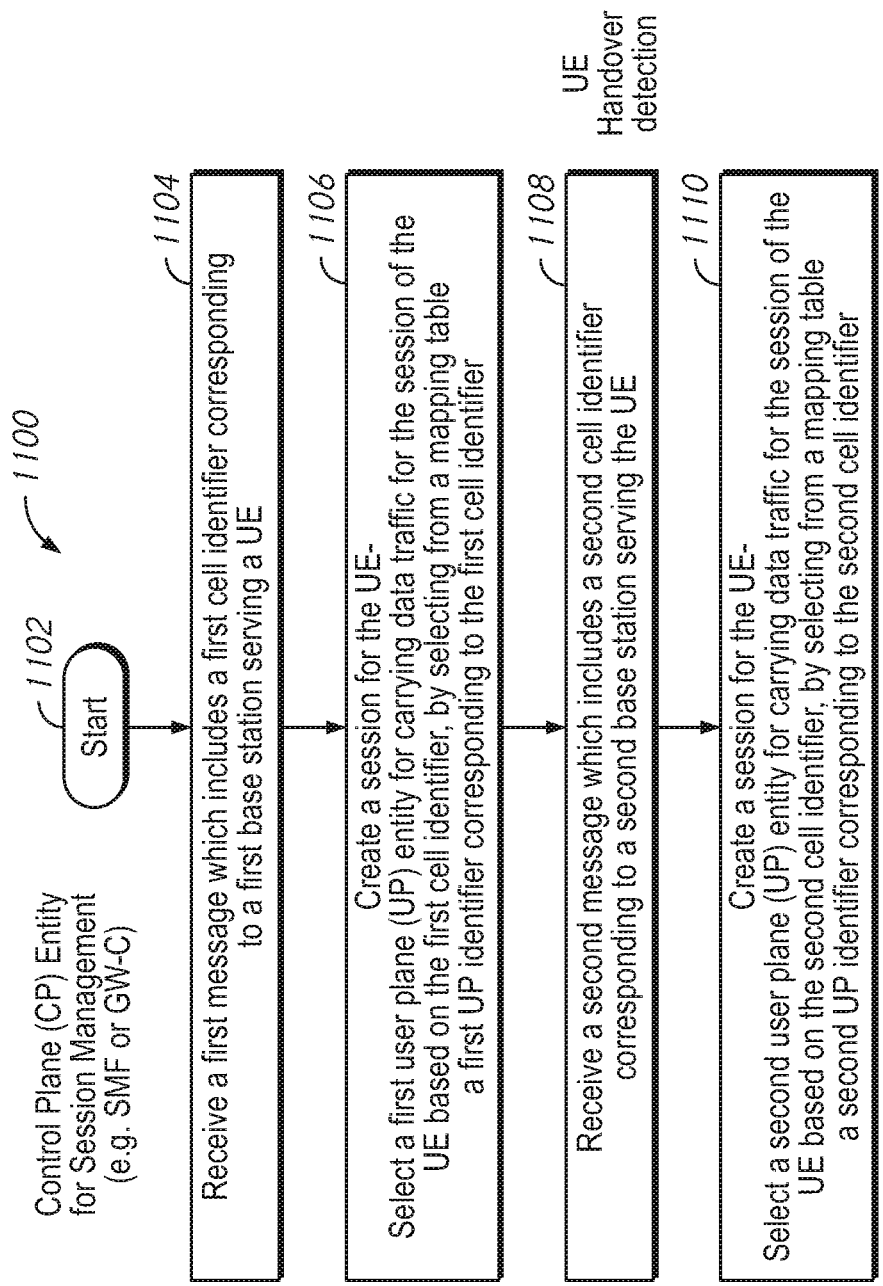
FIG. 11 is a flowchart for describing a more general method for use in selecting/reselecting a UP entity and/or an IP address for a session for a UE, which may be performed by the CP entity for session management.

FIG. 11 is a flowchart 1100 for describing a more general method for use in selecting/reselecting a UP entity and/or an IP address for a session of a UE, which may be performed by a CP entity for session management (e.g. SMF or GW-C). This method may be more general than the method performed by the CP entity for session management described in relation to FIG. 9.

Beginning at a start block 1102 of FIG. 11, a first message may be received (step 1104 of FIG. 11). The first message may include a first cell identifier corresponding to a first base station serving a UE. A data session may be created for the UE (step 1106 of FIG. 11). For the data session, a first UP entity for carrying data traffic of the UE may be selected based on the first cell identifier. More particularly, the first UP entity for carrying the data traffic for the UE may be selected based on the first cell identifier with use of a mapping table.

The mapping table may include a plurality of cell identifiers mapped to a corresponding plurality of UP identifiers. The mapping in the mapping table may be a geographic or location mapping, and configured such that each UP entity of a plurality of UP entities identified by the plurality of UP identifiers is located in proximity to (or in a region of) a corresponding base station of a plurality of base stations identified by the plurality of cell identifiers. Mapping and mapping tables are illustrated in more detail later in relation to FIGS. 12A-12B.

In addition, the data session may also utilize a (selected and assigned) first IP address which is sent to the UE for configuration, where the first IP address is selected from a first pool of IP addresses allocated to the selected first UP entity.

Subsequently, a second message may be received (step 1108 of FIG. 11). The second message may be received after or in response to a handover being performed for the UE from the first base station to a second base station. The second message may include a second cell identifier corresponding to the second base station serving the UE. At this time, the data session may still utilize the first UP entity for carrying data traffic for the UE and the first IP address. The second base station may be located in a second region (or second mobile edge computing (MEC deployment) which is outside of or different from the first region (or first MEC deployment) of or associated with the first UP entity.

In response, a new data session may be created for the UE (step 1110 of FIG. 11). For the new data session, a second UP entity for carrying data traffic of the UE is selected based on the second cell identifier. More particularly, a second UP entity for carrying the data traffic for the UE may be selected based on the second cell identifier with use of the mapping table. Again, mapping and mapping tables are illustrated in more detail later in relation to FIGS. 12A-12B. In addition, the new data session may also utilize a (selected and assigned) second IP address which is sent to the UE for configuration, where the second IP address is selected from a second pool of IP addresses allocated to the selected second UP entity.

As is apparent, the second UP entity (and second IP address) may be in or associated with the second region within which the second base station is located. The second UP entity may be a geographically-appropriate UP entity for the UE being served by the second base station.

Figure 12A:
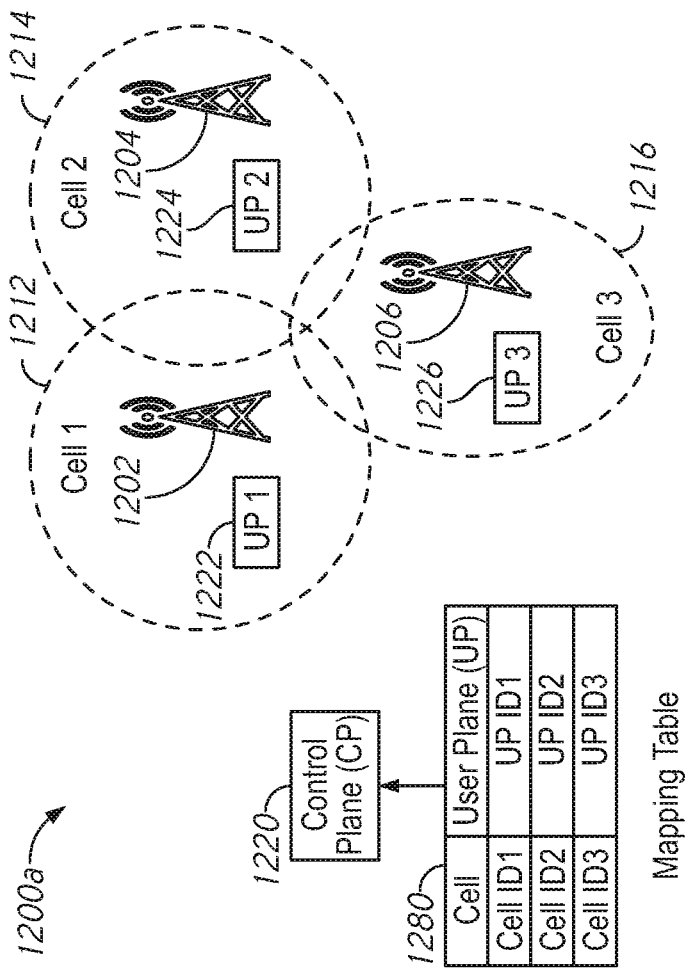
FIG. 12A is an illustrative representation of a plurality of base stations of a mobile network, where each base station/cell is associated with a corresponding UP entity, and a CP entity for session management maintains access to a mapping table having a plurality of cell identifiers mapped to a corresponding plurality of UP identifiers of UP entities.

FIG. 12A is an illustrative representation 1200a of relevant mobile network entities of a mobile network for illustrating a mapping and mapping table for associating a plurality of base stations/cells with a plurality of UP identifiers of UP entities. In FIG. 12A, a plurality of base stations 1202, 1204, and 1206 are associated with cells 1212, 1214, and 1216, respectively. Each base station 1202, 1204, and 1206 (and/or each corresponding cell 1212, 1214, and 1216) is associated with a (unique) corresponding UP entity 1222, 1224, and 1226. A CP entity 1220 for session management may maintain access to a mapping table 1280 having a plurality of cell identifiers of cells 1212, 1214, 1216 mapped to a respective plurality of UP identifiers of the UP entities 1222, 1224, and 1226. Such a mapping and mapping table 1280 may be configured for use in the techniques of FIGS. 9-11, as well as FIGS. 13, 14A-14C, and 15A-15B described below.

Figure 12B:
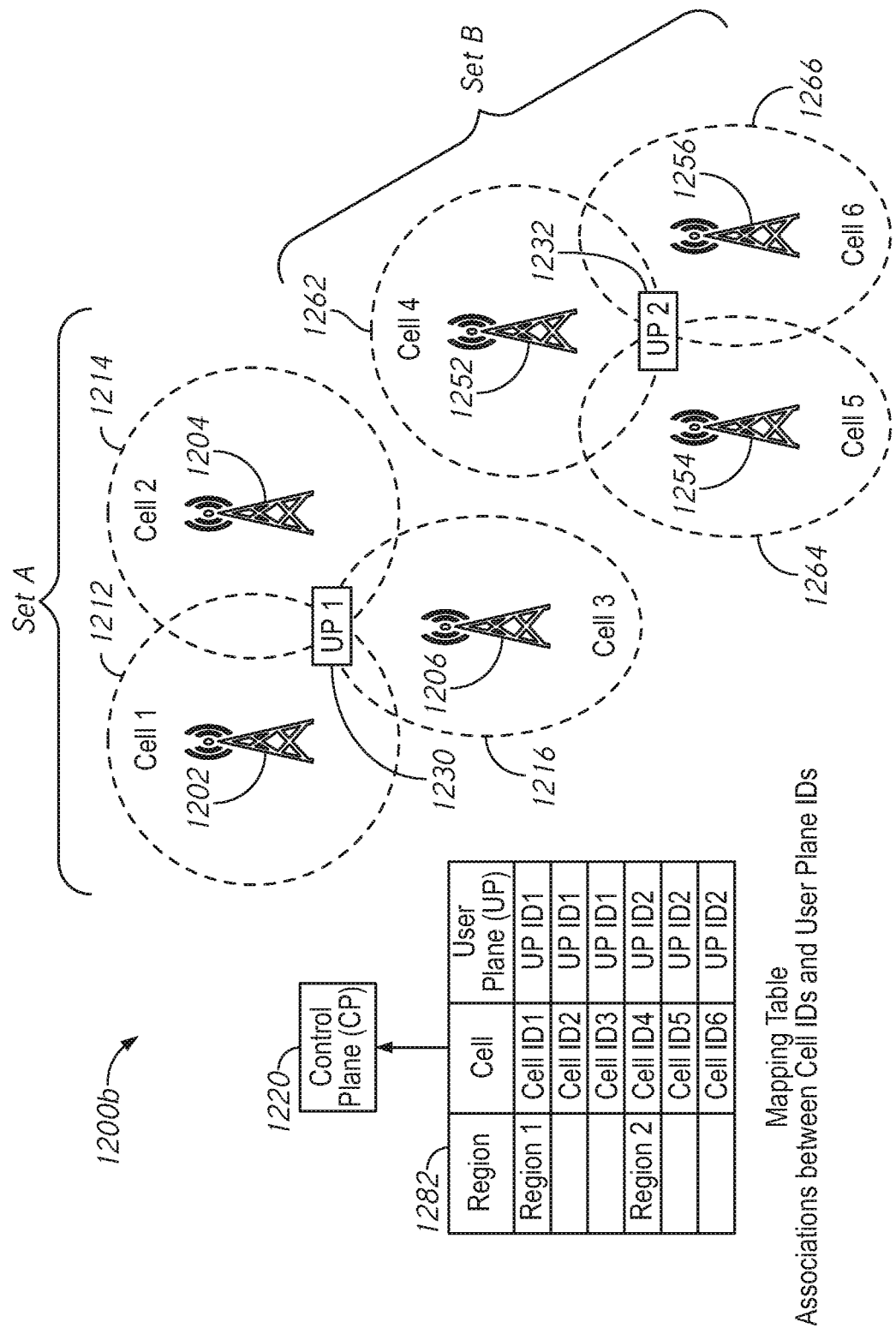
FIG. 12B is an illustrative representation of a plurality of sets of base stations of a mobile network, where each set of base stations is associated with a corresponding UP entity, and the CP entity for session management maintains access to a mapping table having a plurality of sets of cell identifiers mapped to a corresponding plurality of UP identifiers of UP entities.

FIG. 12B is another illustrative representation of 1200b of relevant mobile network entities of a mobile network for illustrating a more preferred mapping and mapping table for associating a plurality of base stations/cells with a plurality of UP identifiers of UP entities. In FIG. 12B, an example of a plurality of sets of base stations in the mobile network are shown and indicated as set A and set B. Set A includes the plurality of base stations 1202, 1204, and 1206 associated with cells 1212, 1214, and 1216, respectively. Set B includes a plurality of base stations 1252, 1254, and 1256 associated with cells 1262, 1264, and 1266. Each set of base stations may be associated with a (unique) corresponding UP entity. For example, set A may be associated with a UP entity 1230, and set B may be associated with a UP entity 1232. CP entity 1220 for session management may maintain access to a mapping table 1282 having each one of a plurality of sets of cell identifiers mapped to a UP identifier of a UP entity. Such a mapping and mapping table 1280 be configured for use in the techniques of FIGS. 9-11, as well as FIGS. 13, 14A-14C, and 15A-15B described below.

FIG. 13 is a process flow diagram 1300 for describing a method for use in selecting/reselecting a user plane function and/or an IP address for a session for a UE, as specifically applied to a 5G mobile network (e.g. the 5G mobile network of FIGS. 1A-1B). Additional entities in FIG. 13 not previously identified in FIGS. 1A-1B include a $gNB_1$ 1350 (i.e. first base station) and a $gNB_2$ 1360 (i.e. a second base station), as well as an application server (AS) 1380. Note that, throughout the description of FIG. 13 and elsewhere, the selection of a UPF (or other NF) may be restated as the selection of a specific UPF instance (or other NF instance) associated with a unique ID.

To begin in FIG. 13, UE 102 is being served by a $gNB_1$ 1350 in a first cell. UE 102 may send via a $gNB_1$ 1350 one or more messages 1302 which include a request to attach and a request to create a session for UE 102 (step 1302 of FIG. 13). The $gNB_1$ 1350 may communicate to AMF 112 the one or messages which include the request for creating the session (step 1304 of FIG. 13). In turn, AMF 112 may communicate to SMF 120a a corresponding request for creating the session for the UE 102 (step 1306 of FIG. 13).

SMF 120a may select UPF1 122a for the session (step 1308 of FIG. 13). The selection of the user plane may be based on a (received) cell identifier of $gNB_1$ 1350. The received cell identifier may be, for example, a cell ID or a cell global identification (eCGI). After selection of the UPF1 122a, an IP address may be selected and assigned to UE 102 for the session; this selected and assigned IP address may be sent to the UE 102 for configuration. The selected and assigned IP address may be selected from a pool of IP addresses allocated to UPF1 122a. SMF 120a may send to the selected UPF1 122a a message for creating a data traffic flow of the session (step 1310 of FIG. 13), and data packets are communicated in the data traffic flow using the selected UPF1 122a (step 1312 of FIG. 13). Note that responses and/or acknowledgements may be passed back though the various entities (e.g. SMF, AMF In some implementations, the selection in step 1308 may be performed with use of a mapping table which includes a plurality of cell identifiers mapped to a respective plurality of UPF identifiers of UPF entities. Each cell identifier may correspond to a UPF identifier of a UPF entity; alternatively, each one of a plurality of sets of cell identifiers of a region may correspond to a UPF identifier of a UPF entity. In some implementations, the selection in step 1308 may be performed by selecting the UPF having the UPF identifier that corresponds to the received cell identifier with reference to the mapping table. In other implementations, the selection in step 1308 may be performed based on factors or considerations in addition to the received cell identifier and/or selected (e.g. suggested or prioritized) UP. Mapping and mapping tables are illustrated in more detail in relation to FIGS. 12A-12B.

UE 102 may be relocated and in closer proximity to $gNB_2$ 1360 in a second cell. In response, one or more messages for a handover of UE 102 from $gNB_1$ 1350 to $gNB_2$ 1360 may be communicated (steps 1314 and 1316 of FIG. 13). One of the messages may be a message which includes a path switch request. In response, AMF 112 may send to SMF 120a a message which includes a handover indication for the handover (step 1318 of FIG. 13). More particularly, the message in step 1318 may be or include a modify bearer request which includes a cell identifier (e.g. a cell ID, or eCGI) of $gNB_2$ 1360. Additional messages may be communicated for the completion of the handover of UE 102 to $gNB_2$ 1360 (with reference ahead to steps 1324, 1326, and 1328 of FIG. 13).

SMF 120a has identified that UE 102 has changed cells or regions (e.g. from step 1318 and/or 1320). Reference to the mapping table may be made for identifying whether a change in UPF is to be made (step 1320 of FIG. 13). If it is identified that a change in UPF is to be made in step 1320, SMF 120a may send to UE 102 a message which includes a detach request including a reactivation request (step 1322 of FIG. 13). This message may instruct UE 102 to disconnect and re-attach to the network, and re-establish the connection. The message may include, for example, a detach request with a cause value of 39 which indicates "reactivation requested."

UE 102 may receive the message which includes the detach request, and respond by detaching and reattaching to the network with a (new) request for creating or re-creating a session. More particularly, UE 102 may send via $gNB_2$ 1360 one or more messages which include a request to attach and request to create a session for the UE 102 (step 1330 of FIG. 13). The $gNB_2$ 1360 may communicate to AMF 112 the one or more messages which include the request for creating the session (step 1332 of FIG. 13). In turn, AMF 112 may communicate to SMF 120a a corresponding request for creating the session for the UE (step 1334 of FIG. 13).

SMF 120a may select a new UPF2 122b for the session (step 1336 of FIG. 13). The selection of the user plane may be based on a (received) cell identifier of gNB$_2$ 1360. The received cell identifier may be, for example, a cell ID or a eCGI. After selection of the UPF2 122b, an IP address may be selected and assigned to UE 102 for the session; this selected and assigned IP address may be sent to the UE 102 for configuration. The IP address may be selected from a pool of IP addresses allocated to UPF2 122b. SMF 120a may send to the selected UPF2 122b a message for creating a data traffic flow of the session (step 1338 of FIG. 13), and data packets are communicated in the data traffic flow using the selected UPF2 122b (step 1340 of FIG. 13).

In some implementations, the selection in step 1336 may be performed with use of the mapping table which includes the plurality of cell identifiers mapped to the respective plurality of UPF identifiers of UPF entities. In some implementations, the selection in step 1336 may be performed by selecting the UPF having the UPF identifier that corresponds to the received cell identifier with reference to the mapping table. In other implementations, the selection in step 1336 may be performed based on factors or considerations in addition to the received cell identifier and/or selected (e.g. suggested or prioritized) UP. Mapping and mapping tables are illustrated in more detail in relation to FIGS. 12A-12B.

Now, techniques for the selection/reselection of user plane and/or IP address for a session of a UE as specifically applied to a 4G/LTE based network with Control and User Plane Separation (CUPS) are described. The techniques may be applied for use in "re-siting" a user plane (UP) function or IP anchor. The techniques may select a UP function that is geographically appropriate or close to a UE, which may reduce latency, as well as a set of criteria which may define when latency reduction (i.e. re-siting) is warranted (e.g. a mobility event has occurred and, therefore, a more geographically appropriate UP is available and providing the same or suitable QoE).

Note that new protocols, such as hybrid information centric networking (hICN) and quick UDP Internet connection (QUIC) protocols, address mobility with features that eliminate the need to follow the basic mobile network principle of IP address preservation on handover. In the same vein, some client applications are known to be resilient to IP address changes on the client stack. These apps silently re-establish a TCP connection after an IP address change occurs, and conceal any impact to the user experience by playing from a locally-cached video buffer.

The assumption inherent to the operation of these protocols and use of these techniques is "anchorless mobility": an IP address used by a mobile will be local to a region and, when the UE moves from one region to another, its IP address will change. The use of newer protocols or app-design techniques resilient to handover events promises to reduce the cost of operating cellular networks by building mobility as a feature inherent to the protocol or app rather than a feature of the mobile network.

MEC deployments are intended to reduce latency to the end-user device through proximity. In an MEC deployment based on 5G mobile core (disaggregated) architecture, the IP anchor for a specified PDU (i.e. the 5G equivalent of a PDN connection such as Internet, IMS, other) is to be located at the edge while the SMP (i.e. the control plane) is to be centrally located.

Unfortunately, as a UE moves across IP address regions in the coverage area, the default behavior in the mobile network will be to create "hairpins" in the transport network. These hairpins are undesirable and negate the value of MEC deployments. On the other hand, the mobile backhaul design may not even support such hairpins. If the mobile backhaul design does not support hairpins, a reconnection will be attempted only after a PDN session times out due to inactivity. However, the per-APN idle-timeout timer may be set to be relatively large (e.g. in a sampling of 2,600 configuration files, the average timer setting was found to be twenty (20) minutes). As is apparent, relying on timeouts simply may not be acceptable.

Accordingly, techniques for "re-siting" an IP anchor are provided herein. Re-siting is a process of re-selecting the UP function or entity such that it is more geographically appropriate for the session. The IP anchor may be re-sited to a new, closer (e.g. the closest) (e.g. CUPS) user plane. The present techniques may also provide the desired effect of changing the IP address on UP re-siting, where newer, handover-resilient protocols can demonstrate their value.

Without use of any technique, there would either be a lengthy period of time where nothing happens or no occurrence of re-siting. The former occurs when no IP connectivity exists for UPs for re-siting and the PDN connection simply has to timeout; the latter is simply a consequence of the way mobility is supported in 3GPP. Simply put, removing "anchoring" from the mobile network in a standards-compatible way is not a simple task.

Accordingly, the abstraction of the control plane and the user plane in the MEC means a session continues at the control level and, instead of changing, the IP anchor is left unchanged. According to some implementations, based upon policy, APN, and capability exchange, the control plane may determine that the user plane should be re-sited, based upon policy, APN, capability exchange, and perhaps other factors.

To change the IP anchor, the present techniques may make use of an access identifier (e.g. a cell identifier, or cell global identification or eCGI) which is mapped to the appropriate MEC and/or UP entity (e.g. in the MEC). Thus, an eCGI-to-UP mapping mechanism built into the (e.g. CUPS) control plane may be utilized. The CP may have access to storage of a table of eCGIs, each mapped to a ranked list of preferred, geographically-appropriate UP entities. When a selected UP entity is identified to be unavailable or congested, the next (geographically-appropriate or suitable) UP entity in the list may be selected. While the connection is re-sited and (e.g. geographically) optimized, traffic may be temporarily hair-pinned between the new and old UPs.

Figure 14A:
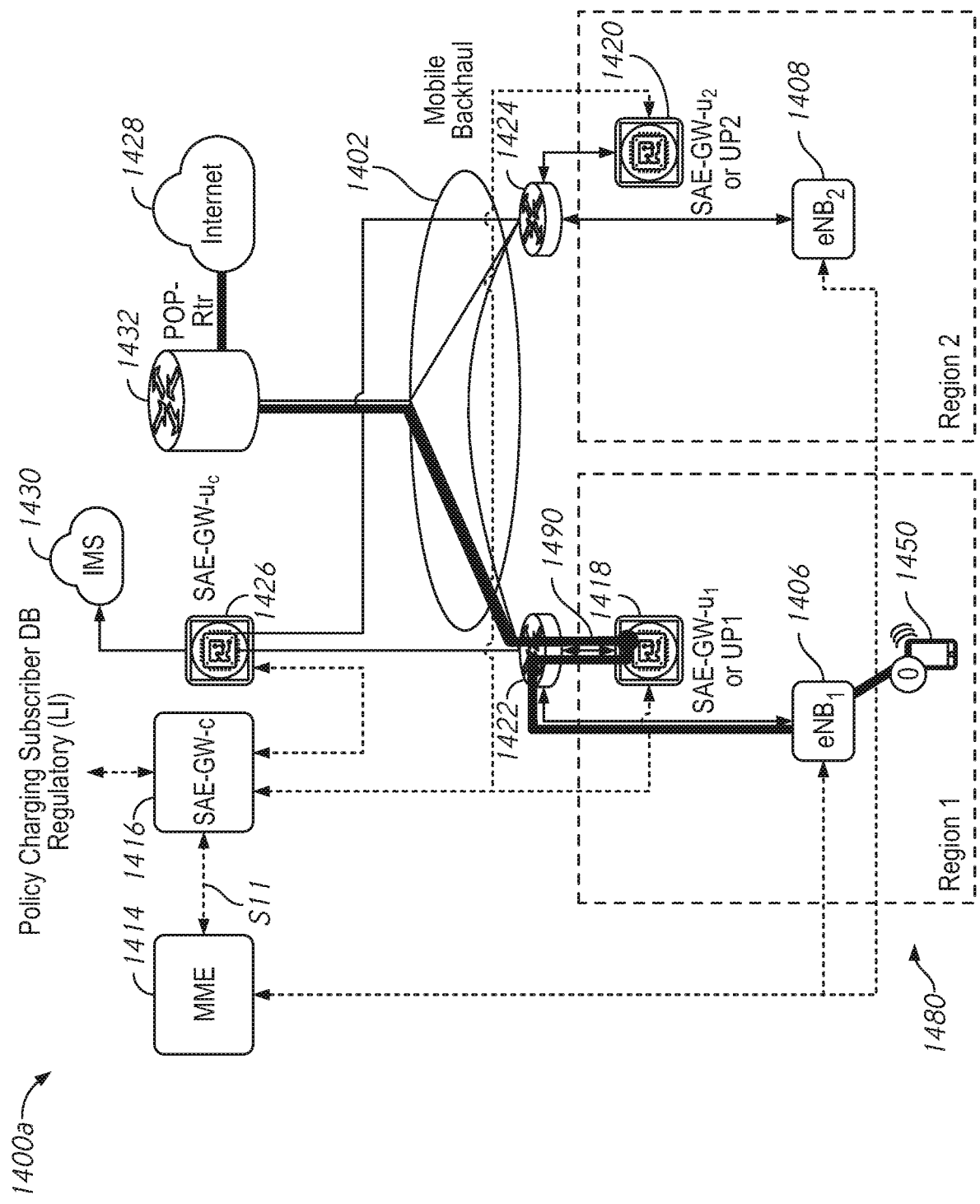
FIGS. 14A, 14B, and 14C are illustrative representations of a network architecture of 4G/LTE-based mobile network, where in FIG. 14A a UE is located in Region 1 and has a connection with the mobile network, where in FIG. 14B the UE is relocated from Region 1 to Region 2 such that a hairpin in the connection is created, and where in FIG. 14C the hairpin is removed after performance of a technique for re-siting of the present disclosure.

To illustrate the present techniques in more detail, FIG. 14A is an illustration of pertinent entities of a 4G/LTE-based mobile network 1400a according to some implementations of the present disclosure.

Mobile network 1400a of FIG. 14A includes a core network 1402, a plurality of eNodeBs (eNBs) 1480 which include an eNB$_1$ 1406 and an eNB$_2$ 1408 (or more generally, base stations), routers 1422 and 1424, a mobility management entity (MME) 1414, an SAE-GW-c 1416 (centralized control plane), a centralized SAE-GW-u$_c$ 1426 (centralized user plane), a localized SAE-GW-u$_1$ 1418 (user plane 1 or UP1), and a localized SAE-GW u2 1420 (user plane 2 or UP2).

The pertinent entities in FIG. 14A may be connected as shown in FIG. 14A. The eNB$_1$ 1406 and SAE-GW-u$_1$ 1418 located in region 1 are connected to core network 1402 via router 1422. Similarly, the eNB$_2$ 1408 and SAE-GW-u$_2$ 1420 located in region 2 are connected to core network 1402 via router 1424. The Internet 1428 may be connected to core network 1402 via POP-Rtr 1432, whereas an IP multimedia subsystem (IMS) 1430 may be connected to core network 1402 via centralized SAE-GW-u$_c$ 1426 (centralized user plane). Thus, with the decomposed SAE-GW, centralized SAE-GW-u$_c$ 1426 (centralized user plane) is configured to support PDN connections for IMS 1430, but PDN connections for Internet 1428 are supported on a regional basis. Note that, unlike what is shown in FIG. 14A, a regional UP may support multiple eNBs. See e.g. FIG. 12B.

Figure 14B:
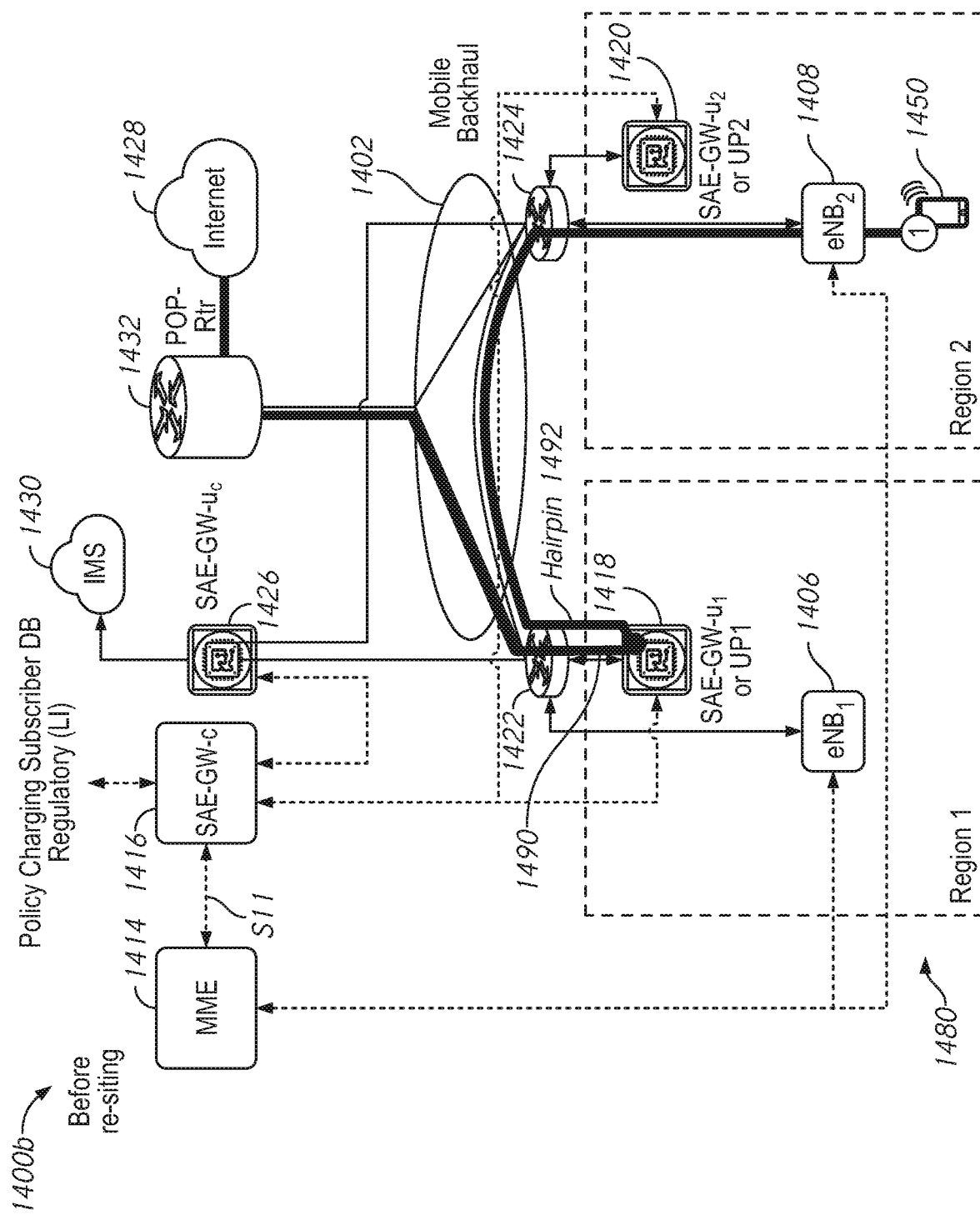

In FIG. 14A, UE 1450 communicates with mobile network 1400a via eNB$_1$ 1406 in Region 1 (see e.g. reference point "0") where an IP anchor of a connection 1490 is maintained at SAE-GW-u$_1$ 1418 or UP1 located in Region 1. In FIG. 14B, mobile network 1400b is illustrated again, however UE 1450 has been relocated from Region 1 to Region 2 (see e.g. reference point "1"). UE 1450 communicates with mobile network 1400b via eNB$_2$ 1408 in Region 2, however the IP anchor is still maintained at SAE-GW-u$_1$ 1418 or UP1 located in Region 1, which creates a hairpin 1492 in the connection 1490.

Figure 14C:
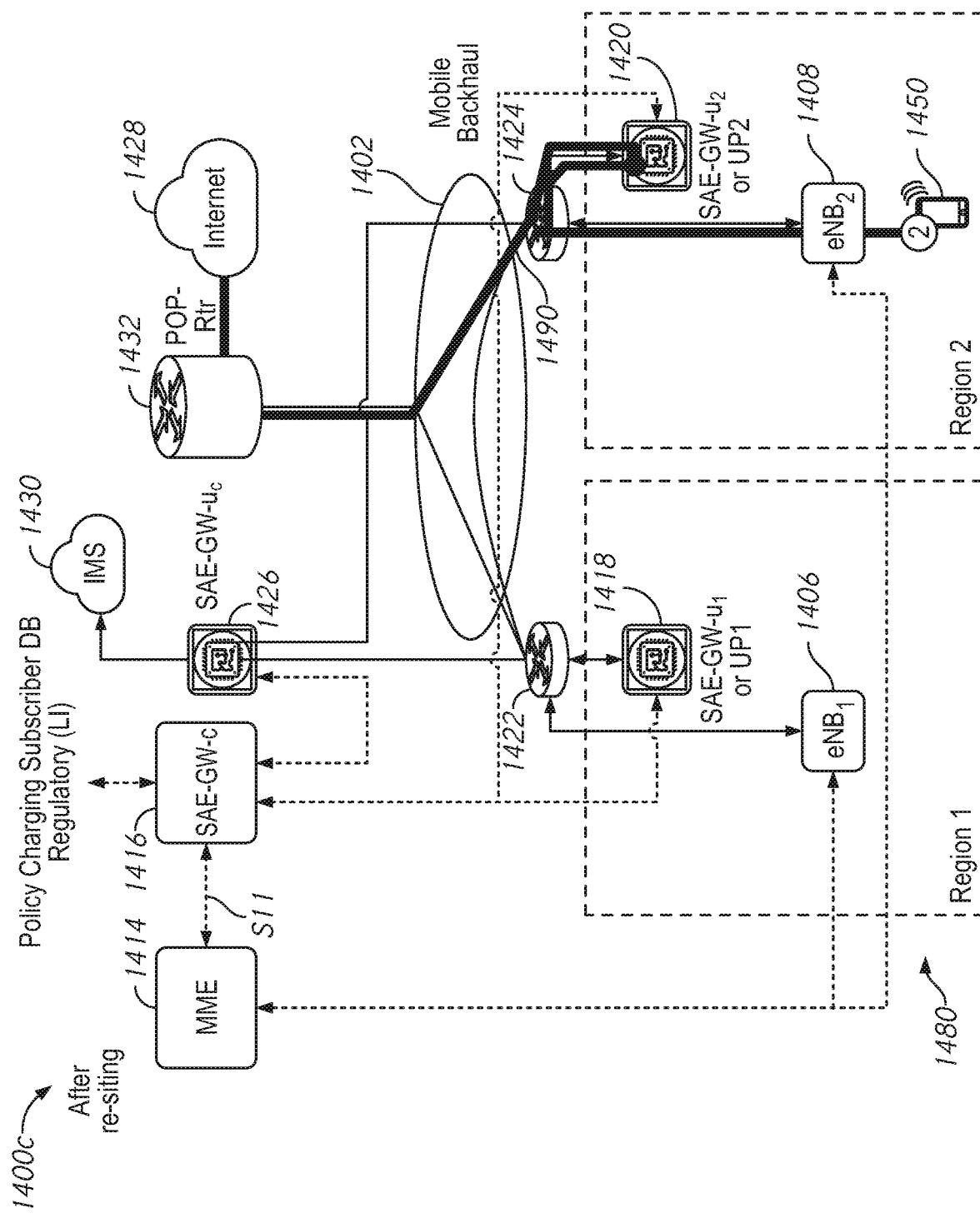

In FIG. 14C, mobile network 1400c is shown again where re-siting of the IP anchor has been performed in accordance with techniques of the present disclosure. Re-siting to a more geographically-appropriate UP, namely SAE-GW-u$_2$ 1420 or UP2 located in Region 2, removes the hairpin in the connection 1490.

With more detail, re-siting may involve two general steps. In general step 1, a specific PDN connection subject to re-siting is removed with cause "reactivation required". In general step 2, the previously-removed PDN connection is reactivated through the NAS stack on the UE and a geographically-appropriate UP is selected.

More specifically with respect to the above-mentioned general step 1, what may be performed is a GTP-c Delete Bearer Request procedure defined in § 7.2.9.2 of TS 29.274 with cause code 8 "Reactivation Requested" as defined in § 8.4 of TS 29.274. The call flow may be that provided in § 5.4.4.1 of TS 23.401 with the R14 changes in § 6.3 of TS 23.214. More specifically with respect to general step 2, what may be performed is the UE Requested PDN Connectivity procedure as detailed in § 5.10.2 of TS 23.401 with the R14 changes in § 6.3 of TS 23.214. These general steps are described in more detail in the call flow that follows.

In some implementations, the techniques may be enabled on a per-PDN basis, thereby allowing an operator to enable re-siting only when anchorless mobility is desired or required. For example, anchorless mobility may be designated as a desirable attribute of a special APN or on the Internet APN, but not on an IMS APN. In addition, the techniques of the present disclosure may be implementable with any suitable level of pre-region granularity. A region may be the coverage area of a single eNodeB (multiple sectors) or multiple eNodeBs. Criteria for implementing the re-siting is also described herein. If a hand-over resilient protocol is not being used, then operator policy may require IP address preservation.

Figure 15A:
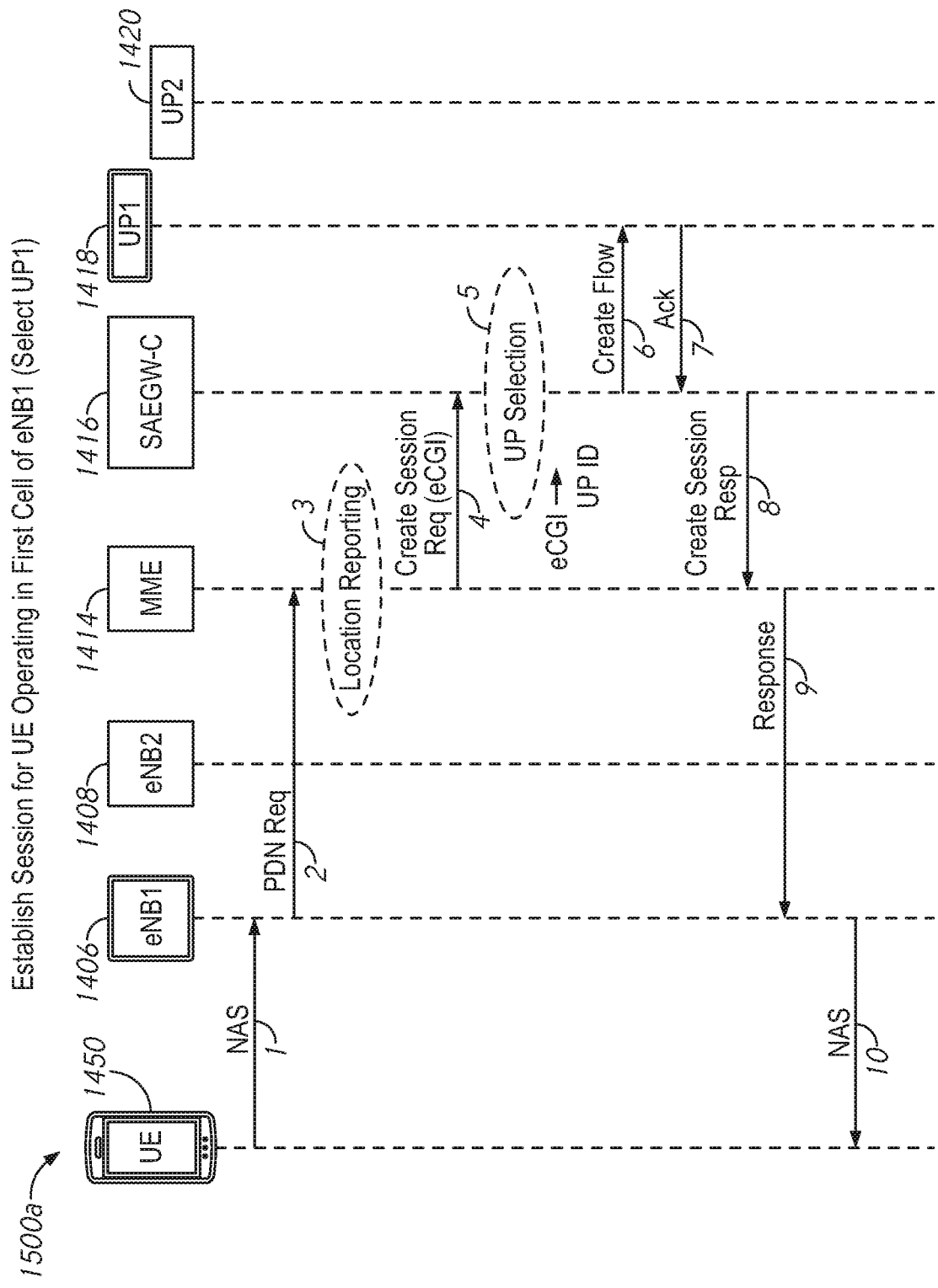
FIGS. 15A, 15B, and 15C are process flow diagrams for describing a method for use in re-siting an IP anchor in the 4G/LTE-based mobile network.
Figure 15B:
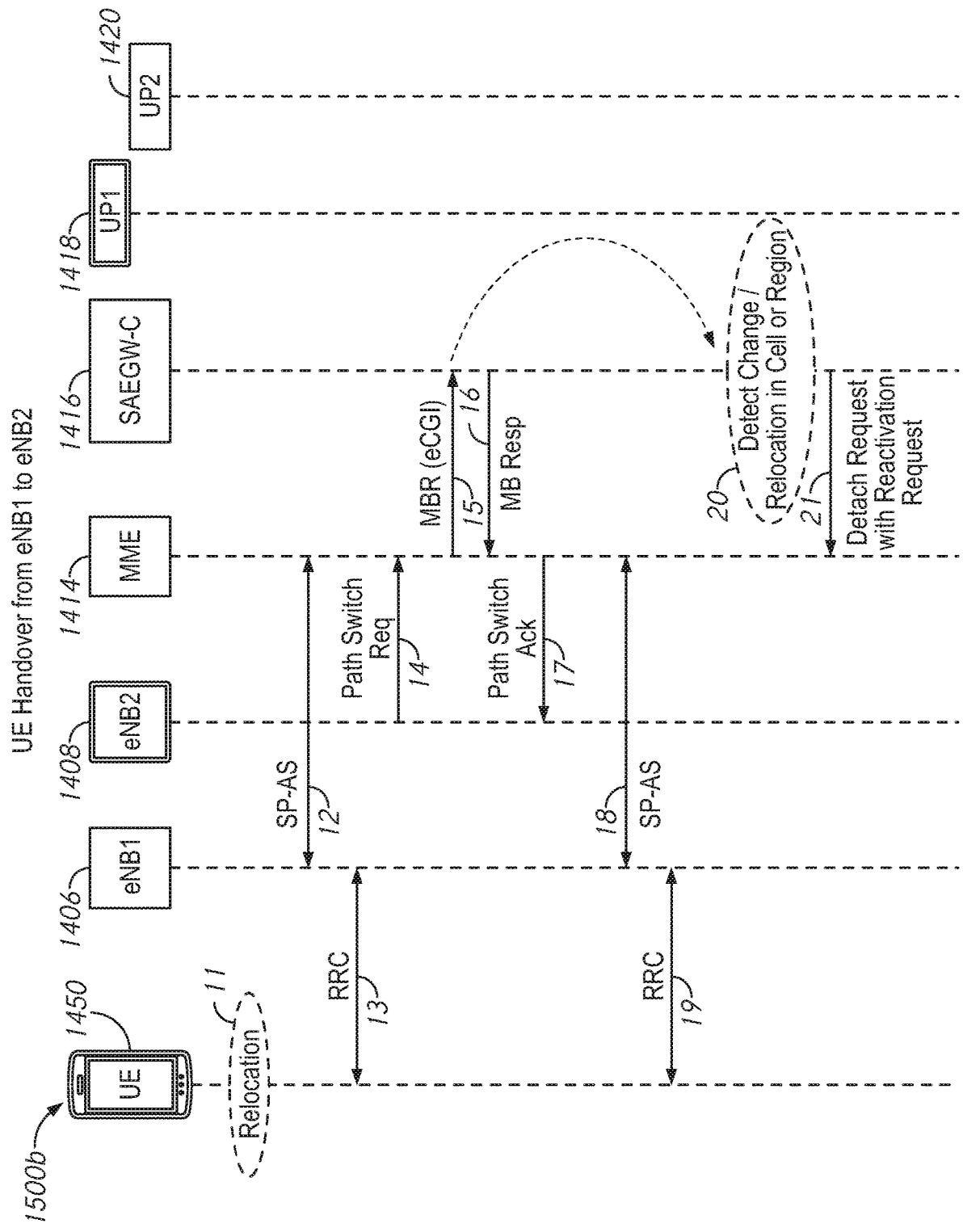
Figure 15C:
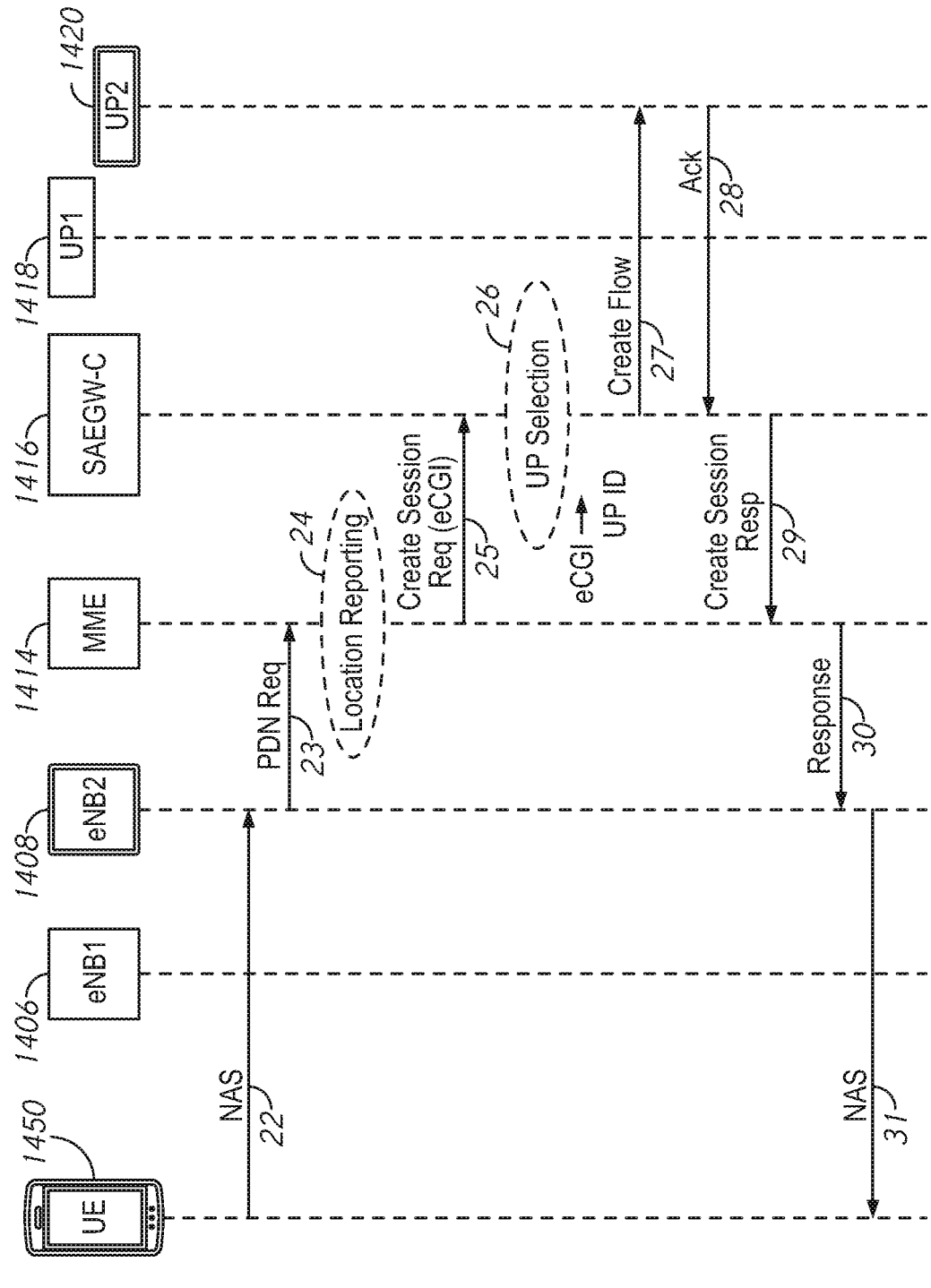

FIGS. 15A, 15B, and 15C are process flow diagrams 1500a, 1500b, and 1500c for describing a method for use in re-siting an IP anchor in the 4G/LTE-based mobile network of FIGS. 14A, 14B, and 14C.

In FIG. 15A, UE 1450 may initially access the mobile network via eNB$_1$ 1406. UE 1450 may send to eNB$_1$ 1406 one or more non-access stratum (NAS) messages which includes a PDN connectivity request (step 1 of FIG. 15A). The PDN connectivity request may be forwarded by eNB$_1$ 1406 to MME 1414 (step 2 of FIG. 15A). In response, MME 1414 may perform location reporting (step 3 of FIG. 15A).

MME 1414 may then send to SAE-GW-c 1416 a message which includes a create session request (step 4 of FIG. 15A). The message may include a cell identifier of eNB$_1$ 1406 (e.g. an eCGI). In response, SAE-GW-c 1416 may select a UP for the session (i.e. UP1 or SAE-GW-u$_1$ 1418) (step 5 of FIG. 15). The selection of the UP may be performed based on the cell identifier of eNB$_1$ 1406. In preferred implementations, the selection of the UP is performed by referencing a mapping table (e.g. as previously described in relation to FIGS. 9-14). SAE-GW-c 1416 may send a message for creating a data flow for the session using SAE-GW-u$_1$ 1418 (step 6 of FIG. 15A). SAE-GW-u$_1$ 1418 may acknowledge the message (step 7 of FIG. 15A). SAE-GW-c 1416 may send to MME 1414 a message which includes a create session response as a response to the message of step 4 (step 8 of FIG. 15A). MME 1414 may, in turn, send to eNB$_1$ 1406 a message which includes a PDN connectivity response, as a response to the message of step 2 (step 9 of FIG. 15A). The eNB$_1$ 1406 may forward to UE 1450 this response in a NAS message (step 10 of FIG. 15A).

Continuing with process flow diagram 1500b of FIG. 15B, sometime later during operation, UE 1450 is moved or relocated to a different geographic location (step 11 of FIG. 15B). As a result, the mobile network may identify that a handover from eNB$_1$ 1406 to eNB$_2$ 1408 should be performed. Here, communication using an SP application protocol (AP) (SP-AP) may be used between MME 1414 and eNB$_1$ 1406 for handover signaling (step 12 of FIG. 15B). Further, one or more radio resource connection (RRC) messages may be communicated between UE 1450 and eNB$_1$ 1406 for the handover (step 13 of FIG. 15B). The eNB$_2$ 1408 may then send to MME 1414 a message which includes a path switch request (step 14 of FIG. 15B). In response, MME 1414 may send to SAE-GW-c 1416 a message which includes a modify bearer request (MBR) (step 15 of FIG. 15B). For the handover, SAE-GW-c 1416 may send to MME 1414 a message which includes a modify bearer response (MBR) (step 16 of FIG. 15B). In response, MME 1414 may send to eNB$_2$ 1408 a packet switch acknowledgement for acknowledgement of the request in step 14 (step 17 of FIG. 15B). The S1-AP (SP-AP) interface between MME 1414 and eNB$_2$ 1408 may be used for handover signaling (step 18 of FIG. 15B). Further, one or more RRC messages may be communicated between UE 1450 and eNB$_2$ 1408 for completion of the handover of UE 1450 to eNB$_2$ 1408 (step 19 of FIG. 15B).

Referring back to step 15 of FIG. 15B, note that the received message which includes the MBR may include the new eCGI of eNB$_2$ 1408. SAE-GW-c 1416 may detect a mobility event or change based on this received message (step 20 of FIG. 15B). The detection may be made based on receiving the new eCGI, with or without reference to the mapping table. In some implementations, SAE-GW-c 1416 may identify whether the UP should be changed based on reference to the mapping table (e.g. change the UP based on a change in region, in contrast to a mere change in cell). If SAE-GW-c 1416 identifies that the UP should be changed, then SAE-GW-c 1416 may send a message which includes a detach request with a reactivation request (step 21 of FIG. 15B). This message may instruct the UE 1450 to disconnect and re-attach to the network, and re-establish the connection. In some implementations, the message in step 16 may include, for example, a detach request with a cause value=39 which indicates "reactivation requested" (e.g. cause value=39).

UE 1450 may receive the message which includes the detach request with reactivation requested. In response, UE

1450 will detach and reattach to the network, and recreate the session (i.e. create a new session). With reference now to FIG. 15C, in response to receipt of the message, UE 1450 may send to eNB$_2$ 1408 a NAS message which includes an attach and a PDN connectivity request (step 22 of FIG. 15C). The PDN connectivity request may be forwarded by eNB$_2$ 1408 to MME 1414 (step 23 of FIG. 15C). In response, MME 1414 may perform location reporting (step 24 of FIG. 15C). MME 1414 may then send to SAE-GW-c 1416 a message which includes a create session request (step 25 of FIG. 15C). The message may include a cell identifier of eNB$_2$ 1408 (e.g. an eCGI). In response, SAE-GW-c 1416 may select a new UP for the session (i.e. UP2 or SAE-GW-u$_2$ 1420) (step 26 of FIG. 15C). The selection of the UP may be performed based on the cell identifier of eNB$_1$ 1406. In preferred implementations, the selection of the UP is performed by referencing the mapping table (e.g. as previously described in relation to FIGS. 9-14). SAE-GW-c 1416 may send a message for creating a data flow for the session using SAE-GW-u$_2$ 1420 (step 27 of FIG. 15C). SAE-GW-u$_2$ 1420 may acknowledge the message (step 28 of FIG. 15C). SAE-GW-c 1416 may send to MME 1414 a message which includes a create session response as a response to the message of step 25 (step 29 of FIG. 15C). MME 1414 may, in turn, send to eNB$_2$ 1408 a message which includes a PDN connectivity response, as a response to the message of step 23 (step 30 of FIG. 15C). The eNB$_2$ 1408 may forward to UE 1450 this response in a NAS message (step 31 of FIG. 15C).

Figure 16:
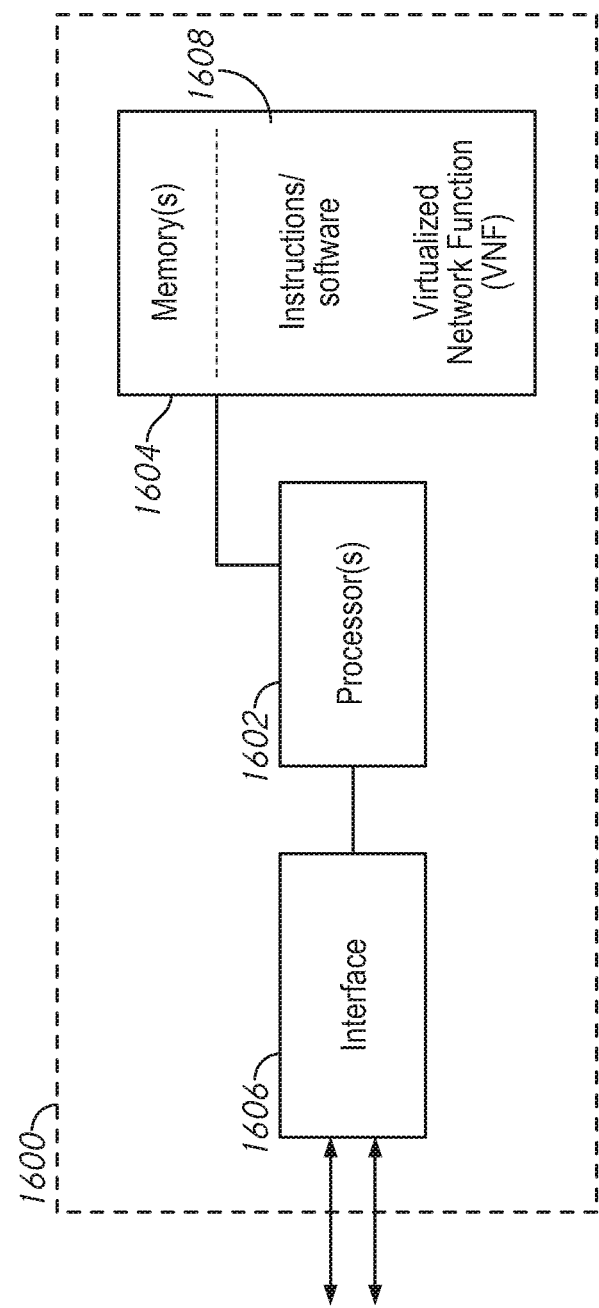
FIG. 16 is a block diagram of a server, network device or equipment which may be used in some implementations of the present disclosure.

FIG. 16 is a block diagram of a server, network device or equipment 1600 which may be used in some implementations of the present disclosure. Network equipment 1600 of FIG. 16 has components which may include one or more processors 1602 coupled to memory 1604 and to communication interface 1606. Interface 1606 is configured to connect to one or more networks for communications. The one or more processors 1602 of the network equipment are configured to operate in accordance with program instructions 1608 stored in memory 1604, in order to perform basic functions as well as techniques of the present disclosure, as described above in relation to the Figures. In some implementations, the program instructions may provide a NF, a VNF, or an NFV of the present disclosure. The techniques of the present disclosure may be embodied as a computer program product including a non-transitory computer readable medium and instructions (e.g. instructions provided as an NF, VNF, or NFV module) stored in the non-transitory computer readable medium, where the instructions are executable on one or more processors of the server or network device for performing the steps of the technique.

Thus, methods and apparatus for use in selecting network slice, session management and user plane functions for a session for a user equipment (UE) have been described herein. In one illustrative example, a control plane (CP) entity for mobility management may select a CP entity for session management for a session of a user equipment (UE) based on a first set of data items. The CP entity for mobility management may further select a user plane (UP) entity for the session of the UE based on a second set of data items, where second set of data items include at least some of the same data items of the first set. The CP entity for mobility management may send, to the selected CP entity for session management, a message including an identity or indication of the selected UP entity for the session of the UE. The selected CP entity for session management may choose the identified or indicated UP entity in the message for use in the session of the UE. In some implementations, the CP entity for mobility management may be an access and mobility management function (AMF) of a 5G mobile network, where the identity or indication of the selected UP entity is included in a data field for a data network name (DNN) of a create session request message. Alternatively, the CP entity for mobility management may be a mobility management entity (MME) of a 4G/LTE based mobile network, where the identity or indication of the selected UP entity is included in a data field for an access point name (APN) of a create session request message.

In another illustrative example, a CP entity for session management may receive, from a CP entity for mobility management, a message which includes a create session request for creating a session for a UE. The CP entity for session management may identify from the message an identity or indication of a user plane (UP) entity. The CP entity for session management may select, for use in the session, a UP entity corresponding to or based on the identity or indication of the UP entity from the message. The CP entity for session management may send, to the selected UP entity, a message which includes a session establishment request for establishing the session. In some implementations, the CP entity for session management may be a session management function (SMF) of a 5G mobile network, where the identity or indication of the selected UP entity is extracted from a data field for a data network name (DNN) of the create session request. Alternatively, the CP entity for mobility management may be a gateway (GW) control plane (CP) entity (GW-C) of a 4G/LTE based mobile network, where the identity or indication of the selected UP entity is extracted from a data field for an access point name (APN) of the create session request.

Additional methods and apparatus of the present disclosure are for use in selecting/reselecting a UP entity and/or an IP address for a session for a UE, which may performed by a CP entity for session management (e.g. a GW-C or SMF). In one illustrative example, a message which includes a request for creating a session for a UE may be received, where the UE is being served by a first base station in a first cell. A first UP entity may be selected for the session based on a first cell identifier of the first base station. The selection may be performed with use of a mapping table which includes a plurality of cell identifiers mapped to a respective plurality of UP identifiers of UP entities. Subsequently, a message which includes a handover indication of a handover of the UE from the first base station to the second base station may be received. In response, a message which includes a detach request including a reactivation request may be sent to the UE. Note that the UE may respond to the message by detaching and reattaching to the network with a (new) request for creating a (new) session. Accordingly, a message which includes a request for creating a session for a UE may be received, where the UE is being served by the second base station in the second cell. A second UP entity may be selected for the session based on a second cell identifier of the second base station. The selection may be performed with use of a mapping table. A corresponding method of the UE may be performed for selecting/reselecting a UP entity and/or an IP address for a session for a UE.

As another illustrative example performed by a CP entity for session management (e.g. GW-C or SMF), a first message may be received, where the first message includes a first cell identifier corresponding to a first base station serving a UE. A data session may be created for the UE, which includes selecting a first UP entity for carrying data traffic of the UE based on the first cell identifier. More particularly, the first UP entity for carrying the data traffic for the UE may be selected based on the first cell identifier with use of a mapping table which includes a plurality of cell identifiers mapped to a respective plurality of UP identifiers of UP entities. The mapping in the mapping table may be a geographic or location mapping, and configured such that each UP entity of a plurality of UP entities identified by the plurality of UP identifiers is located in proximity to (or in a region of) a corresponding base station of a plurality of base stations identified by the plurality of cell identifiers. Subsequently, a second message may be received, where the second message includes a second cell identifier corresponding to a second base station serving the UE. A new data session may be created for the UE, which includes selecting a second UP entity for carrying data traffic of the UE based on the second cell identifier. More particularly, the second UP entity for carrying the data traffic for the UE may be selected based on the second cell identifier with use of the mapping table which includes the plurality of cell identifiers mapped to the respective plurality of UP identifiers of UP entities. The second UP entity may be a geographically-appropriate UP entity for the UE being newly served by the second base station.

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first cell identifier could be termed a second cell identifier, and similarly, a second cell identifier could be termed a first cell identifier, without changing the meaning of the description, so long as all occurrences of the "first cell identifier" are renamed consistently and all occurrences of the second cell identifier are renamed consistently. The first cell identifier and the second cell identifier are both contacts, but they are not the same cell identifier.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    at a control plane entity for session management for use in a mobile network,
        selecting a user plane entity for carrying data traffic of a connection or a session for a user equipment (UE) operative to communicate via a first base station, the user plane entity comprising an IP anchor for the connection or the session;
        receiving a message indicating a handover of the connection or the session of the UE to a second base station, the handover indicating a change in region; and
        based on the change in region, sending, for receipt by the UE, a message which includes a detach request with a cause value indicating a reactivation request for instructing a UE requested re-attachment for re-establishing the connection or the session.

2. The method of claim 1, wherein the user plane entity comprises a first user plane entity and the IP anchor comprises a first Internet Protocol (IP) anchor, the method further comprising:
    at the control plane entity for session management,
        in response to sending the message which includes the detach request with the cause value indicating the reactivation request, receiving a message indicating a request for creating a re-established connection or session for the UE operative to communicate via the second base station.

3. The method of claim 2, further comprising:
    at the control plane entity for session management,
        in response to receiving the message indicating the request for creating the re-established connection or session for the UE, selecting a second user plane entity for carrying data traffic of the re-established connection or session of the UE operative to communicate via the second base station, the second user plane entity comprising a second IP anchor for the re-established connection or session.

4. The method of claim 3, wherein the message indicating the request for creating the re-established connection or session includes a cell identifier (ID) of the second base station, and selecting the second user plane entity comprises selecting the second user plane entity based on the cell ID of the second base station.

5. The method of claim 1, further comprising:
    determining whether the IP anchor for the connection or the session should be re-sited based on the change in region and one or more of a policy, a latency, a name of an access point or data network, and a capability exchange, wherein sending the message is performed in response to determining that the IP anchor for the connection or session should be re-sited.

6. The method of claim 4, further comprising:

at the control plane entity for session management, maintaining access to a mapping table having a plurality of cell IDs of cells mapped to a plurality of user plane identifiers associated with a plurality of user plane entities, wherein selecting the second user plane entity based on the cell ID of the second base station is performed by referencing the mapping table.

7. The method of claim 6, wherein each user plane entity of the plurality of user plane entities identified by the plurality of user plane identifiers is located in a region associated with a plurality of corresponding base stations.

8. The method of claim 1, wherein:

the control plane entity for session management comprises one of a gateway control plane (GW-C) or a session management function (SMF), and the user plane entity comprises one of a gateway user plane (GW-U) or a user plane function (UPF).

9. A network equipment comprising:

one or more processors;

memory;

a communication interface to connect to a mobile network;

the one or more processors configured to operate as a control plane entity for session management for:

selecting a user plane entity for carrying data traffic of a connection or a session for a user equipment (UE) operative to communicate via a first base station, the user plane entity comprising an Internet Protocol (IP) anchor for the connection or the session;

receiving a message indicating a handover of the connection or the session of the UE to a second base station, the handover indicating a change in region; and based on the change in region, sending, for receipt by the UE, a message which includes a detach request with a cause value indicating a reactivation request for instructing a UE requested re-attachment for re-establishing the connection or the session.

10. The network equipment of claim 9, wherein the user plane entity comprises a first user plane entity and the IP anchor comprises a first IP anchor, and wherein the one or more processors configured to operate as the control plane entity for session management further for:

in response to sending the message which includes the detach request with the cause value indicating the reactivation request, receiving a message indicating a request for creating a re-established connection or session for the UE operative to communicate via the second base station.

11. The network equipment of claim 10, wherein the one or more processors configured to operate as the control plane entity for session management further for:

in response to receiving the message indicating the request for creating the re-established connection or session for the UE, selecting a second user plane entity for carrying data traffic of the re-established connection or session of the UE operative to communicate via the second base station, the second user plane entity comprising a second IP anchor for the re-established connection or session.

12. The network equipment of claim 11, wherein the message indicating the request for creating the re-established connection or session includes a cell identifier (ID) of the second base station, and the one or more processors configured to operate as the control plane entity for session management are for selecting the second user plane entity by selecting the second user plane entity based on the cell ID of the second base station.

13. The network equipment of claim 12, wherein the one or more processors configured to operate as the control plane entity for session management are for:

determining whether the IP anchor for the connection or the session should be re-sited based on the change in region and one or more of a policy, a latency, a name of an access point or data network, and a capability exchange, wherein sending the message is performed in response to determining that the IP anchor for the connection or session should be re-sited.

14. The network equipment of claim 12, wherein the one or more processors configured to operate as the control plane entity for session management further for:

maintaining access to a mapping table having a plurality of cell IDs of cells mapped to a plurality of user plane identifiers associated with a plurality of user plane entities, wherein selecting the second user plane entity based on the cell ID of the second base station is performed by referencing the mapping table.

15. The network equipment of claim 14, wherein each user plane entity of the plurality of user plane entities identified by the plurality of user plane identifiers is located in a region associated with a plurality of corresponding base stations.

16. The network equipment of claim 9, wherein:

the control plane entity for session management comprises one of a gateway control plane (GW-C) or a session management function (SMF), and the user plane entity comprises one of a gateway user plane (GW-U) or a user plane function (UPF).

17. A computer program product comprising:

a non-transitory computer readable medium;

instructions stored in the non-transitory computer readable medium;

the instructions being executable by one or more processors of a network device for operating as a control plane entity for session management for:

selecting a user plane entity for carrying data traffic of a connection or a session for a user equipment (UE) operative to communicate via a first base station, the user plane entity comprising an Internet Protocol (IP) anchor for the connection or the session;

receiving a message indicating a handover of the connection or session of the UE to a second base station, the handover indicating a change in region;

determining whether the IP anchor for the connection or the session should be re-sited; and in response to determining that the IP anchor should be re-sited, sending, for receipt by the UE, a message which includes a detach request with a cause value indicating a reactivation request for instructing a UE requested re-attachment for re-establishing the connection or the session.

18. The computer program product of claim 17, wherein the user plane entity comprises a first user plane entity and the IP anchor comprises a first IP anchor, and the instructions are further executable by the one or more processors of the network device for operating as the control plane entity for session management for:
- in response to sending the message which includes the detach request with the cause value indicating the reactivation request, receiving a message indicating a request for creating a re-established connection or session for the UE operative to communicate via the second base station; and
- in response to receiving the message indicating the request for creating the re-established connection or session for the UE, selecting a second user plane entity for carrying data traffic of the re-established connection or session of the UE operative to communicate via the second base station, the second user plane entity comprising a second IP anchor for the re-established connection or session.

19. The computer program product of claim 18, wherein the instructions are further executable by the one or more processors of the network device for operating as the control plane entity for session management for:
- maintaining access to a mapping table having a plurality of cell IDs of cells mapped to a plurality of user plane identifiers associated with a plurality of user plane entities; and
- selecting the second user plane entity by selecting the second user plane entity based on a cell ID of the second base station with reference to the mapping table,
- wherein the message indicating the request for creating the re-established connection or session includes the cell ID of the second base station.

20. The computer program product of claim 17, wherein:
- determining whether the IP anchor for the connection or the session should be re-sited is based on the change in region and one or more of a policy, a latency, a name of an access point or data network, and a capability exchange.

* * * * *